United States Patent
Hernandez Saab et al.

(10) Patent No.: US 12,469,923 B2
(45) Date of Patent: Nov. 11, 2025

(54) OPTIMIZED BATTERY ASSEMBLY VENTING

(71) Applicant: Rivian IP Holdings, LLC, Plymouth, MI (US)

(72) Inventors: Daniel Alfredo Hernandez Saab, Irvine, CA (US); Rafael Lujan, Huntington Beach, CA (US); Bruce Philip Edwards, Menlo Park, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 586 days.

(21) Appl. No.: 17/889,984

(22) Filed: Aug. 17, 2022

(65) Prior Publication Data
US 2023/0074688 A1 Mar. 9, 2023

Related U.S. Application Data

(60) Provisional application No. 63/242,290, filed on Sep. 9, 2021.

(51) Int. Cl.
*H01M 50/325* (2021.01)
*H01M 50/249* (2021.01)
*H01M 50/291* (2021.01)

(52) U.S. Cl.
CPC ....... *H01M 50/325* (2021.01); *H01M 50/249* (2021.01); *H01M 50/291* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,557,415 B2 | 10/2013 | Herron et al. | |
| 8,557,416 B2 | 10/2013 | Mardall et al. | |
| 2007/0015046 A1 | 1/2007 | Kim et al. | |
| 2010/0273034 A1* | 10/2010 | Hermann | B60L 50/64 429/62 |
| 2011/0174556 A1 | 7/2011 | Hermann et al. | |

(Continued)

FOREIGN PATENT DOCUMENTS

CN 110190211 A 8/2019

OTHER PUBLICATIONS

U.S. Appl. No. 17/889,981, filed Aug. 17, 2022, Daniel Alfredo Hernandez Saab.

(Continued)

*Primary Examiner* — Gregg Cantelmo
(74) *Attorney, Agent, or Firm* — Haley Guiliano LLP

(57) ABSTRACT

Systems and methods are provided to vent a battery pack system. The battery pack system comprises a first wall positioned in a first portion of a vehicle and a second wall positioned in a second portion of the vehicle. A first plurality of pressure release valves is embedded in the first wall, wherein the first plurality of pressure release valves is arranged release gas from between the first wall and another feature or component of the battery pack system. A second plurality of pressure release valves is embedded in the second wall, wherein the second plurality of pressure release valves are arranged to enable the egress of gas from between the second wall and another feature or component of the battery pack system.

20 Claims, 14 Drawing Sheets

(56) References Cited

U.S. PATENT DOCUMENTS

| | | |
|---|---|---|
| 2012/0231306 A1 | 9/2012 | Herron et al. |
| 2012/0237803 A1* | 9/2012 | Mardall .............. H01M 10/653 |
| | | 429/53 |
| 2020/0152926 A1* | 5/2020 | Wynn ................. H01M 50/155 |
| 2020/0152935 A1 | 5/2020 | Wynn et al. |
| 2020/0152941 A1 | 5/2020 | Wynn et al. |
| 2020/0365859 A1 | 11/2020 | Hoefner |
| 2021/0184196 A1* | 6/2021 | Dao .................... H01M 50/317 |
| 2022/0085452 A1* | 3/2022 | Lee ....................... H01M 50/30 |

OTHER PUBLICATIONS

U.S. Appl. No. 17/890,025, filed Aug. 17, 2022, Daniel Alfredo Hernandez Saab.

* cited by examiner

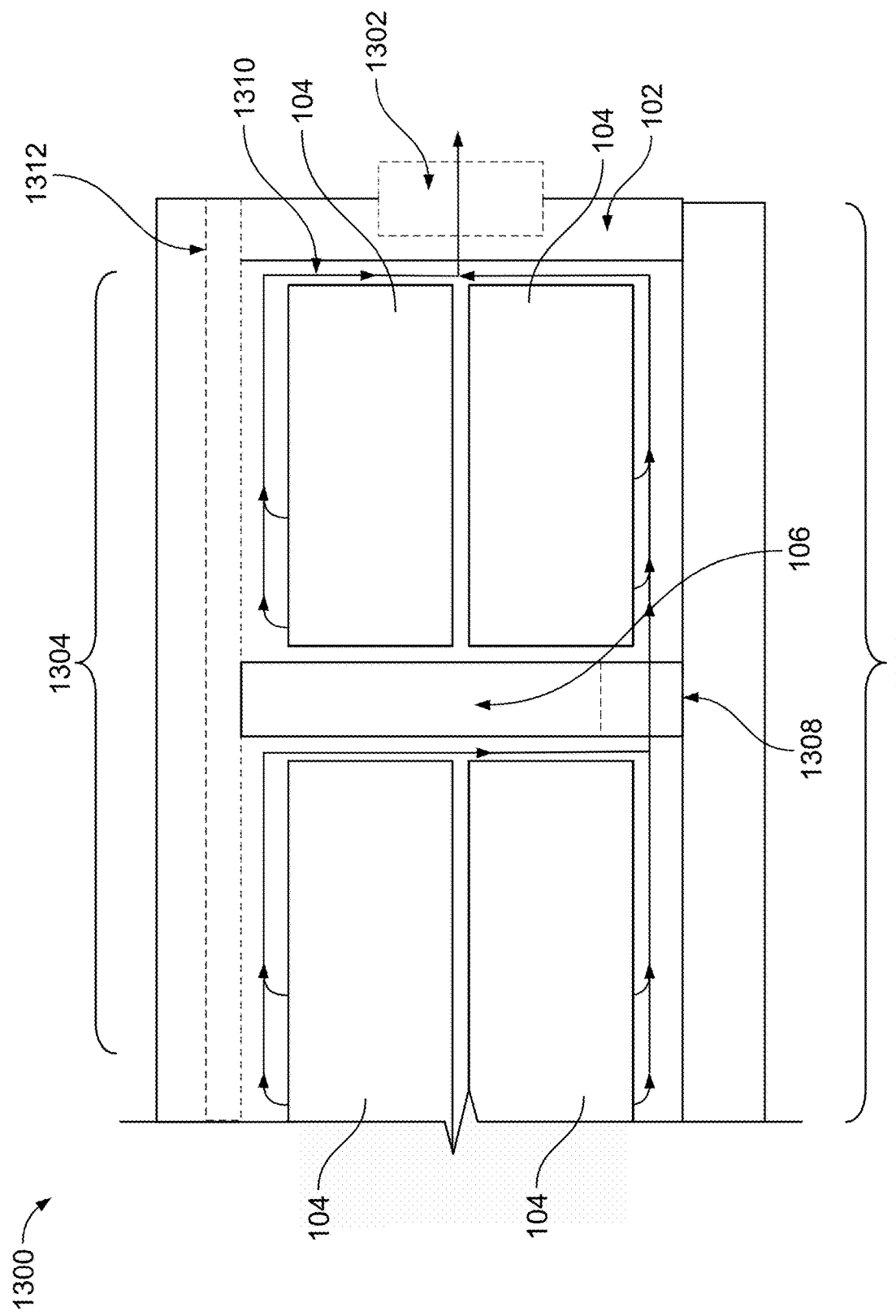

1400

1402A
Providing At Least One Sidewall by Extruding a Rigid Material to Form the At Least One Sidewall

1402B
Machining an Inlet Opening in the Inner Wall to Expose a First Side of the Guiding Rib

1402C
Machining an Outlet Opening in the Outer Wall to Expose a Second Side of the Guiding Rib, Wherein Machining the Second Opening Comprises Machining an Accommodating Recess for a Vent Structure

1402
Providing At Least One Sidewall Comprising an Inner Wall, an Outer Wall, and At Least One Guiding Rib, Wherein the At Least One Guiding Rib Comprises a First End that Abuts the Inner Wall, a Second End that Abuts the Outer Wall, a Profile Structured to Modify the Trajectory of Gas Generated from Inside the Battery Assembly

1404
Arranging the At Least One Sidewall to At Least Partially Form an Enclosure

1406
Arranging a Battery Module Inside the Enclosure, Wherein the Battery Module Comprises a Plurality of Battery Cells

1408
Mounting the Vent Structure to the Outer Wall Such that the Vent Structure is Aligned with Outlet Opening

FIG. 14

OPTIMIZED BATTERY ASSEMBLY VENTING

CROSS-REFERENCE TO RELATED APPLICATIONS

This application claims the benefit of U.S. Provisional Patent Application No. 63/242,290 filed Sep. 9, 2021, the disclosure of which is hereby incorporated by reference herein in its entirety.

INTRODUCTION

The present disclosure is directed to optimized vents and venting of battery assemblies. The present disclosure is also directed to directing flows of heat or pressure out of battery assemblies to avoid a disruption in the operation of the battery assemblies.

SUMMARY

The present disclosure is directed to systems and methods for venting heat and pressure generated by battery cells and other conditions within a battery assembly, and more particularly, to systems and methods that utilize strategically shaped and positioned pressure release valves and other structural features embedded in the walls of the battery assembly to optimize venting of heat and pressure such that the heat and pressure egress the battery assembly. A battery assembly or battery pack incorporating these systems and methods is advantageous in that the pressure release valves, and other structural features, improve efficiency of the operation of the battery cells, reduces environmental stress caused by pressurized gas, and improves overall packaging of the battery assembly as the battery assembly is configured to accommodate the components installed in the environment surrounding the battery assembly.

The battery assembly may comprise at least one sidewall arranged to encompass in part a plurality of battery cells. In some embodiments, the at least one sidewall may comprise an inner surface comprising an inlet opening configured to receive gas generated by the plurality of battery cells, an outer surface comprising an outlet opening configured to vent the gas, and at least one guiding rib that modifies a trajectory of gas (e.g., at least one of ambient air or pressured gas generated as a result of heated battery cells changing conditions of the ambient air in a battery assembly) between the inner surface and the outer surface. The sidewall is advantageous in that it provides an avenue by which pressurized gas can be vented out of the battery assembly and the profile of the guiding rib between the inlet and the outlet stabilize the flow of the pressurized gas and direct the pressurized gas away from at least one of surrounding components or areas that may be occupied by vehicle occupants.

The battery assembly may additionally incorporate at least one pressure release valve, which may be mounted on at least one of the previously described sidewalls which may be referred to as mounting walls herein. The position of the pressure release valve once installed in the sidewall or mounted to the mounting wall may correspond to a position of the previously mentioned outlets in the outer surface. In order to enable optimal venting, the pressure release valve may comprise a housing configured to be secured to a mounting wall, a first membrane positioned towards a first side of the housing, a second membrane positioned adjacent to the first membrane and positioned towards a second side of the housing, and a gasket structured to form a continuous seal between the housing and the mounting wall. The membranes and gasket may be formed out of any material suitable for the temperatures corresponding to an operational battery assembly such that the material is able to maintain a watertight seal once the pressure release valve is installed. In some embodiments, the membranes may comprise at least one of a moveable cover, or a rotating enclosure surface. In some embodiments, portions of the housing may be structured to mechanically deform (e.g., melt such that at least one membrane falls out of the housing) when subjected to the conditions corresponding to thermal runaway resulting from the operation of the battery cells in the battery assembly. When the portions of the housing mechanically deform, the membranes may fall out of the pressure release valve housing in response to being exposed to the thermal runaway condition and create an opening in the mounting wall to enable rapid egress of pressurized gas from within the mounting wall, which may be guided by the previously mentioned guiding rib through the mounting wall to the pressure release valve housing.

The battery assembly may be configured for installation and use in a vehicle. The walls of the battery assembly may comprise the previously discussed sidewall and may comprise a forward-facing wall configured to be positioned towards a front of the vehicle, a rear-facing wall configured to be positioned towards a rear of the vehicle, a first plurality of pressure release valves embedded in the forward-facing wall, wherein the first plurality of pressure release valves is arranged to enable the egress of pressurized gas from between the forward-facing and rear-facing walls, and a second plurality of pressure release valves embedded in the second wall, wherein the second plurality of pressure release valves are arranged to enable the egress of gas from between the forward-facing and rear-facing walls. Each of the first and second plurality of pressure release valves may comprise the two membrane pressure release valves previously discussed. In some embodiments, the two membrane pressure release valves are paired with single membrane pressure release valves to achieve a target egress rate of the pressurized gas generated by the operation of the battery cells within the battery assembly. In some embodiments, there may be a pair of angled two membrane pressure release valves on the forward-facing wall with a set of three two membrane pressure release valves embedded in the rear-facing wall and positioned level with a flat plane defined by the top or the bottom of the rear-facing wall, depending on a determined location of an optimal outlet to ensure a maximum target egress rate. For example, each battery assembly may have a variety of wall positions and features which may affect the path of pressurized gas throughout the assembly. An optimal outlet position for either the first or second plurality of pressure release valves may balance target stiffness of the wall to survive crash conditions, maximum water ingress allowable for the battery assembly, and pressurized gas paths within the battery assembly.

In some embodiments, a battery pack, e.g., for an electric vehicle, includes a pack housing having multiple module bays, e.g., with a crossmember subdividing an interior of the pack housing into two adjacent module bays. One or both of the module bays may be configured to support or provide storage for one or more batteries or battery modules. The crossmember defines a bidirectional or multidirectional vent passage configured to allow fluid communication between the adjacent module bays. The battery pack may also include a pressure release valve positioned at a perimeter of the pack housing. Accordingly, excess pressure from a module bay may pass through the bidirectional vent passage to the one-way vent for venting out of the battery pack. In some embodiments the crossmember that is arranged with the sidewall to form a first enclosure separated from a second enclosure by the crossmember. The crossmember comprises a guiding rib that modifies a trajectory of gas that transfers from the second enclosure to the first enclosure.

In some embodiments, the vent passage may be a slot or window in a crossmember, wall, or other structure between the modules or bays. Gas emitted from a battery cell in one module may thereby flow through the bidirectional vent passage to another module, with the gas being directed out of the adjacent module from the battery pack (e.g., along, or out of a perimeter of the battery pack). The specific locations of the slots, size of the slots, locations and number of vents or pressure release valves from the battery pack may be determined to balance structural support and necessary venting pressure based upon expected pressure/heat generation by the battery cells.

Bidirectional or multidirectional vent passage(s), in at least some embodiments, may freely allow fluid communication between modules, thereby facilitating relatively free flow of gas discharged from a battery cell along a desired flow path out of the battery pack. In some embodiments, the bidirectional vent passage is open and unobstructed by wiring or other components of the battery pack to provide a direct path for fluid communication between the adjacent module bays. The bidirectional vent passage(s) may also facilitate equalization of pressure between the module bays. As a result, gas that is discharged from a cell in one module or bay of the battery pack may be routed effectively to a pressure release valve or one-way pressure release valve which provides a vent path out of the battery pack. Vent flow paths from the modules may be provided to one or more desired locations on the battery pack and may allow consolidation of flow paths for discharged gas out of the battery pack, as will be discussed further below.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 13 depicts a top view of an exemplary battery assembly with flow paths indicative of intended flow of at least one of pressurized or hot gas generated based on the operation of the exemplary battery modules, in accordance with some embodiments of the disclosure; and FIG. 14 is a flowchart depicting an exemplary method of optimizing venting of at least one of pressurized or heated gas generated within a battery assembly, accordance with some embodiments of the disclosure.

DETAILED DESCRIPTION

Methods and systems are provided herein for venting heat and pressure generated by battery cells and other conditions within a battery assembly, and more particularly, to systems and methods that utilize strategically shaped and positioned pressure release valves and other structural features embedded in the walls of the battery assembly to optimize venting of heat and pressure such that the heat and pressure egress the battery assembly.

Figure 1A:
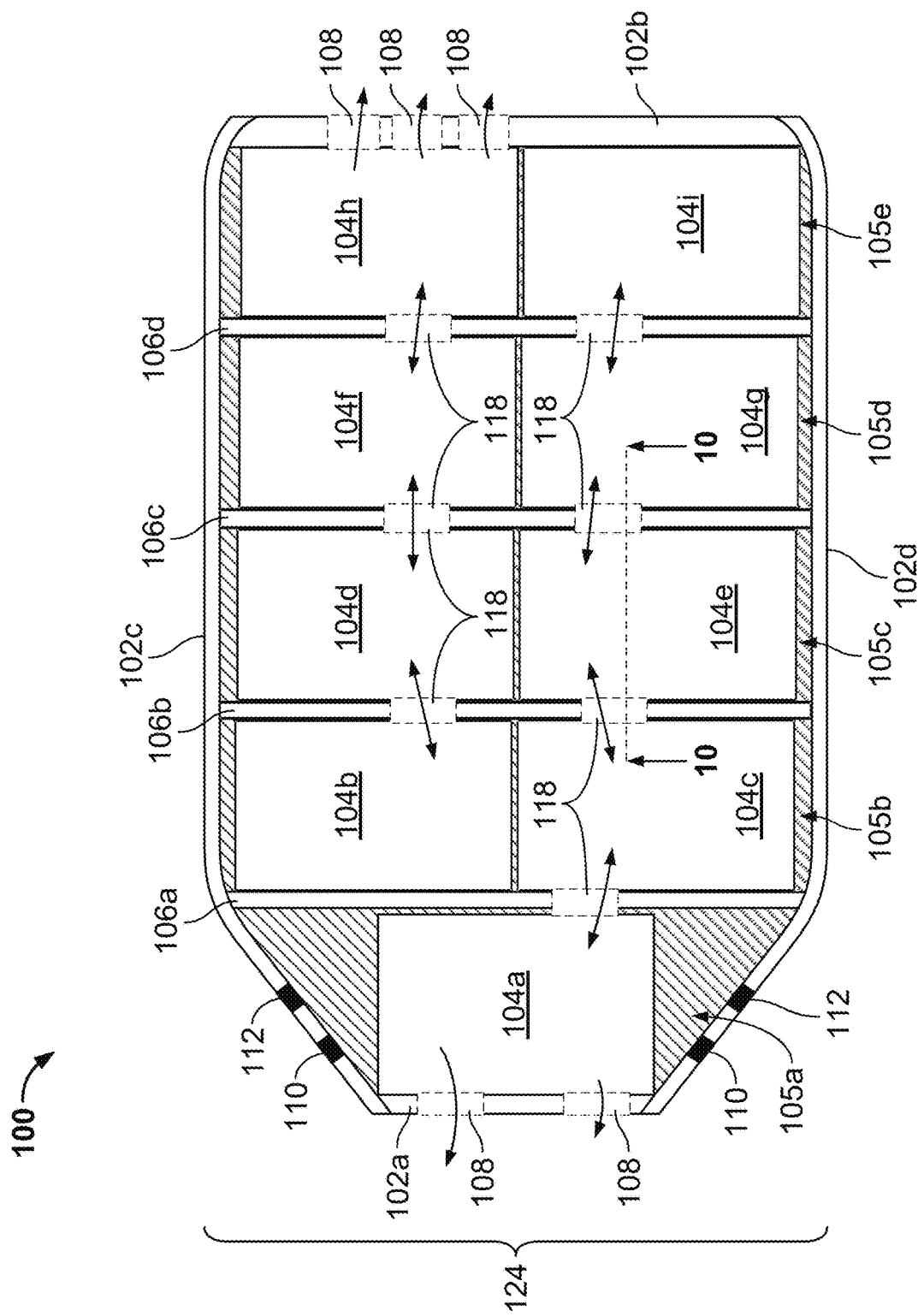
FIG. 1A depicts a top view of an exemplary battery pack, in accordance with some embodiments of the disclosure.
Figure 1B:
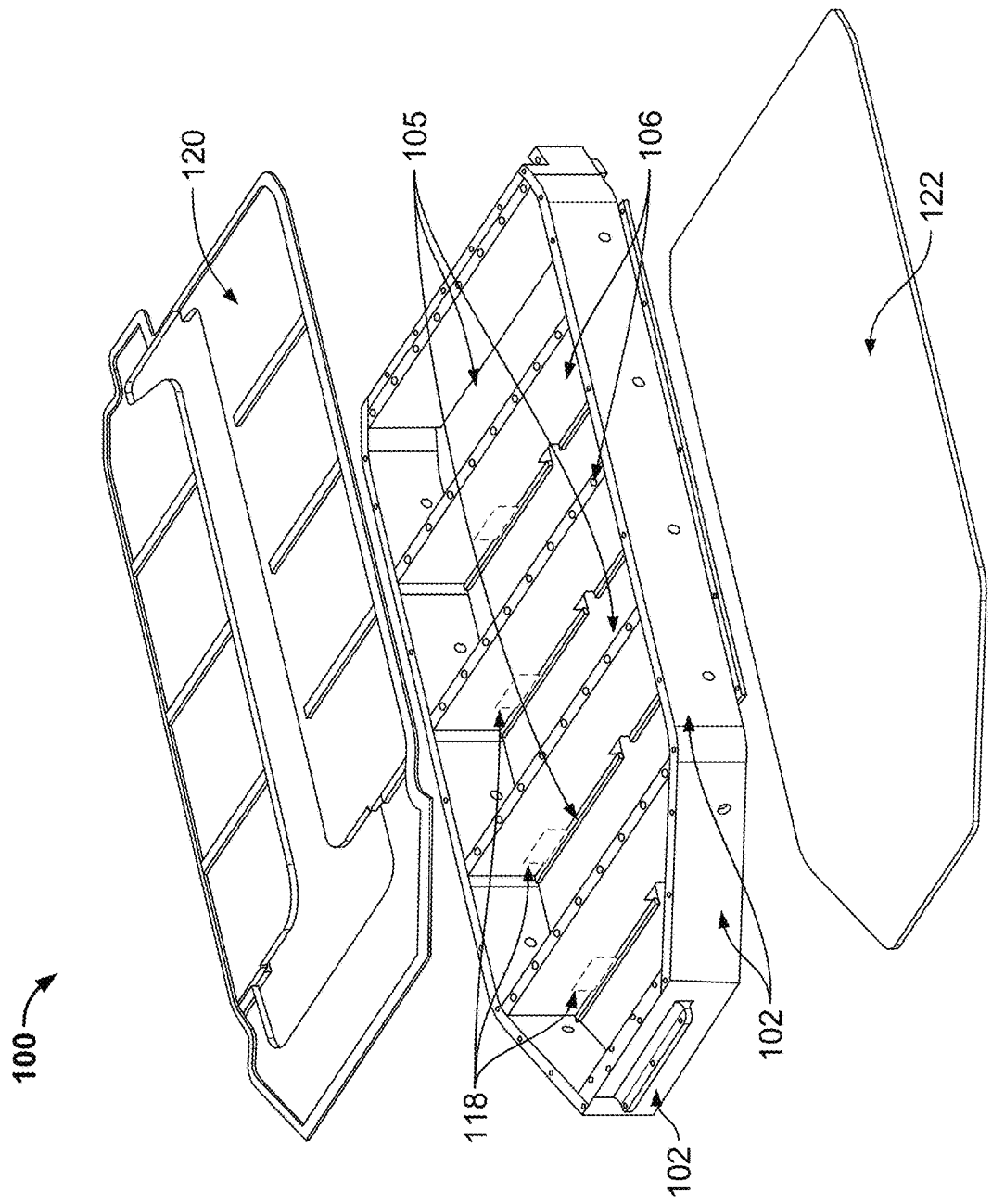
FIG. 1B depicts an exploded view of an exemplary battery pack, in accordance with some embodiments of the disclosure.

FIG. 1A depicts a top view of battery pack 100 (e.g., a battery assembly, a battery pack assembly, a battery pack system, or any combination thereof). FIG. 1B depicts an exploded view of battery pack 100 with battery pack cover 120 and battery pack base 122, in accordance with some embodiments of the disclosure. Battery pack 100 may comprise more or fewer than the components or features depicted in FIGS. 1A and 1B. Battery pack 100 may be incorporated into or may incorporate any or all of the components or features depicted in or described in reference to FIGS. 2A-13. Additionally, battery pack 100 may be assembled, developed, or manufactured based at least in part on any of the steps depicted in or described in reference to FIG. 14.

As shown in FIG. 1A, battery pack 100 represents an example embodiment of the systems and methods described herein. Battery pack 100 is enclosed by sidewalls 102a, 102b, 102c, and 102d (collectively, 102) extending about a perimeter of battery pack 100. Battery pack 100 encloses battery modules 104a, 104b, 104c, 104d, 104e, 104f, 104g, 104h, and 104i (collectively, 104), which collectively provide power to an apparatus or system requiring electrical power for operation (e.g., an electric vehicle powertrain system configured to enable movement of the electric vehicle). Battery modules 104 are enclosed within module bays 105a, 105b, 105c, 105d, and 105e (collectively, 105), which are defined by sidewalls 102 and crossmembers 106a, 106b, 106c, and 106d (collectively, 106). Collectively, sidewalls 102 and crossmembers 106 form housing 124. Each bay of bays 105 is configured to accommodate at least one of battery modules 104, and as shown in FIG. 1A bay 105a is configured to accommodate a single one of battery modules 104 and the each of the remaining bays 105b-e is configured to accommodate two of battery modules 104. In some embodiments, any number of modules 104 may be positioned in any of bays 105 (e.g., depending on the dimensions of at least one of housing 124, any of bays 105, or battery modules 104). Crossmembers 106 each extend laterally along battery pack 100 between sidewalls 102c and 102d.

Battery pack 100 may be substantially sealed such that fluid flow (e.g., at least one of pressurized or heated gas into and out of the enclosure defined by sidewalls 102) is limited to specific venting flow paths. Venting flow paths, as shown in FIG. 1A, are provided by pressure release valves 108, plug valves 110, and deformable pressure release valves 112. Pressure release valves 108, 110, and 112 are generally configured to handle different levels of pressure/flow from battery pack 100 to an external environment surrounding housing 124 of battery pack 100. In some embodiments, plug valves 110 may facilitate relatively low-pressure flows to and from battery pack 100, which may occur due to at least one of thermal expansion or contraction of gas within battery pack 100 corresponding to the operation of battery modules 104. Plug valves 110 may be a generally solid plug of permeable material configured to permit a maximum level of flow that is relatively low, consistent with thermal expansion/contraction of battery pack 100.

Pressure release valves 108 are configured to facilitate one-way flow out of battery pack 100 in response to relatively greater thermal or pressure flows than ambient conditions within battery pack 100 prior to operation of battery modules 104 within module bays 105. Pressure release valves 108 may each include moveable pressure release valve members, such as an umbrella valve or umbrella membrane. In some embodiments, the membranes may comprise at least one of a moveable cover, or a rotating enclosure surface. Each of the moveable pressure release valve members is configured to provide one-way flow out of battery pack 100, while sealing against intrusion of water or other contaminants. Battery pack 100 includes multiple pressure release valves 108, with two provided in front sidewall 102a and three located in rear sidewall 102b.

Figure 9A:
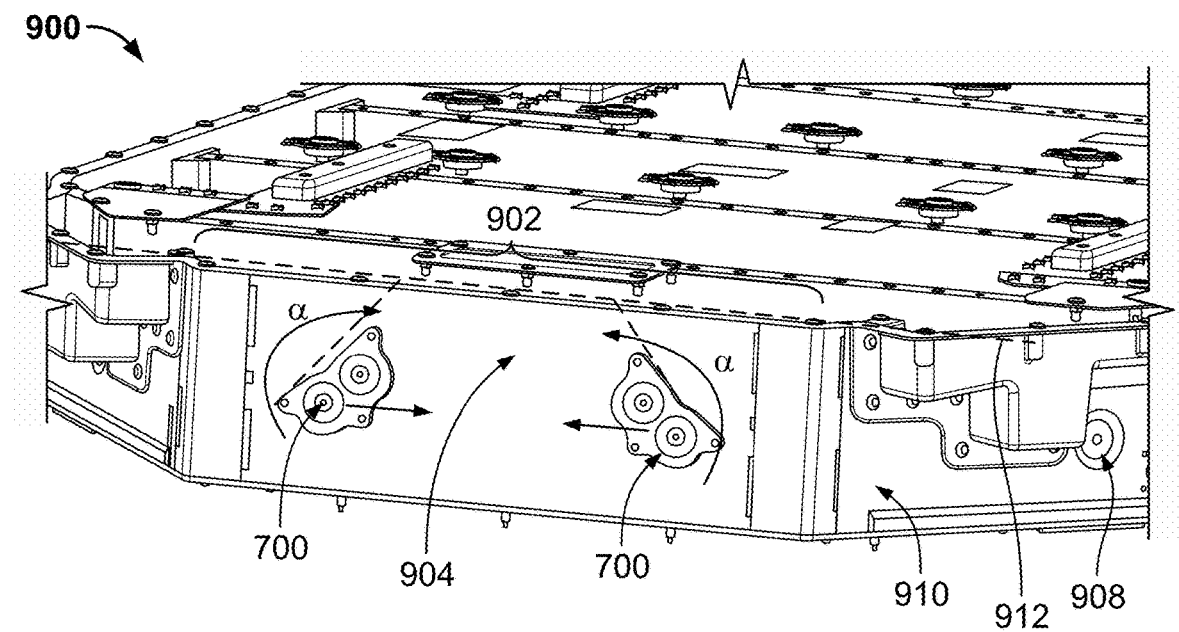
FIGS. 9A and 9B each depict a respective view of an exemplary battery pack sidewall with a pair of angled dual membrane pressure release valves in accordance with some embodiments of the disclosure.
Figure 9B:
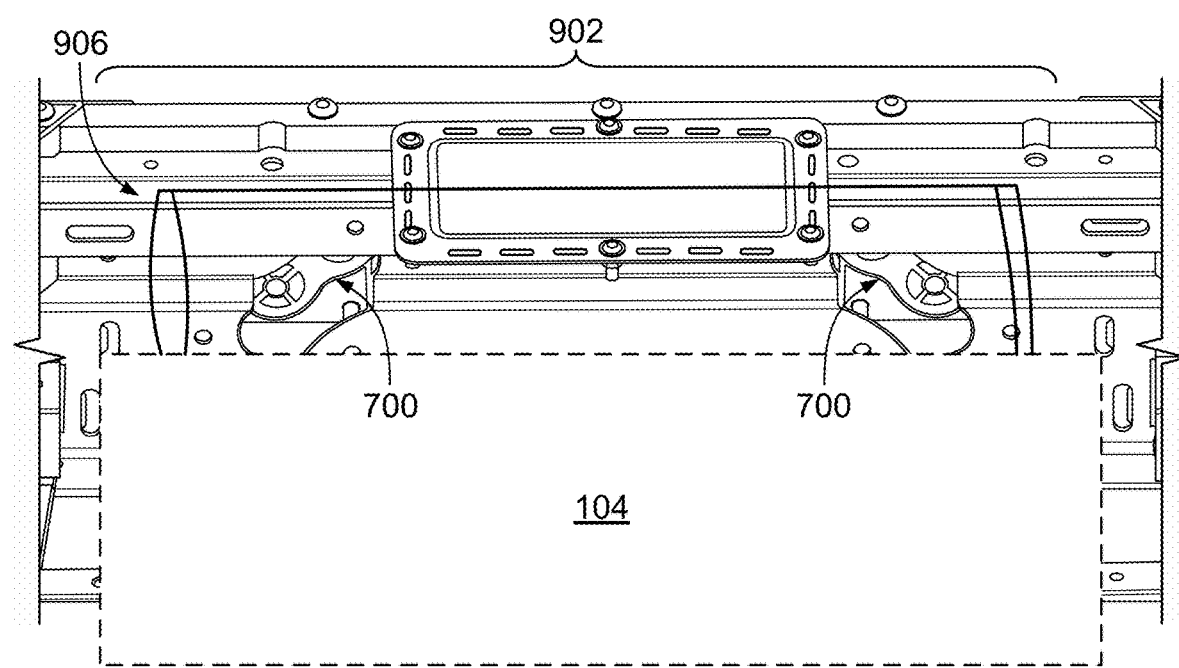

In contrast to plug valves 110 and pressure release valves 108, deformable pressure release valves 112 may facilitate a relatively greater flow of at least one of pressurized or heated gas from within housing 124 (e.g., due to a sudden or extreme thermal event corresponding to at least one battery cell of at least one of battery modules 104). Deformable pressure release valves 112 may include a deformable disc or other structure that is configured to mechanically deform (e.g., break, melt, or otherwise disintegrate such that deformable pressure release valves 112 form an opening in a sidewall of housing 124) in response to a pressure or temperature above a predetermined amount (e.g., as may be characteristic of a thermal event of battery cells in battery pack 100 based on damage to or operation of battery modules 104). Exemplary embodiment of pressure release valve 108 is illustrated in FIGS. 9A and 9B. Pressure is allowed to vent from battery pack 100 (e.g., as shown in FIG. 14). Additionally, flow in the reverse direction, (e.g., into battery pack 100) may be generally prevented by a perimeter seal arranged along at least one of an inner surface or an outer surface of sidewalls 102 (no shown). The perimeter seal may have a preload against a corresponding seal surface, which is generally defined by a flexibility of the perimeter seal (e.g., an ability to elastically deform and retain an original shape despite experiencing strain within an elastic range of the material comprising the perimeter seal) and an insertion load of pressure release valves 108 resulting in a seal between a perimeter of pressure release valves 108 and openings in sidewalls 102 configured to receive pressure release valves 108.

Battery pack 100 may be configured to vent from within housing 124 (e.g., based on at least one of pressurized or heated gas generated within module bays 105 in response to operation of battery modules 104) to the external environment surrounding housing 124 in response to different levels or thresholds of internal pressure or heat corresponding to the different fluid flow paths provided by valves 108, 110, and 112, respectively. In one example, plug valves 110 may be configured to vent an internal pack pressure not exceeding a first pressure threshold (e.g., 5 kPa of pressure within the battery pack 100) which may fall within a range of pressure created by thermal expansion of air contained within battery pack 100. Plug valves 110 may also permit ingress of air in response to thermal contraction of air within battery pack 100. Relatively higher levels of pressure (e.g., from the first pressure threshold to a second or higher pressure threshold), may be vented from battery pack 100 via pressure release valves 108 in response to venting of one or more battery modules 104, higher levels of heat output of battery modules 104 based on the operating conditions of battery modules 104, or other conditions creating additional pressure within battery pack 100. In some embodiments, the pressure thresholds of the disclosure refer to pressure differentials between a space within the battery pack enclosing a battery module or a battery and a space external to the battery pack.

Accordingly, continuing with the example first pressure threshold introduced above, internal pressures of 5 kPa to 10 kPa within battery pack 100 may be vented by at least one of pressure release valves 108. An internal pack pressure reaching a higher pressure threshold than can be serviced by plug valves 110 may be vented via pressure release valves 108. Further, even higher levels of at least one of pressure or heat exceeding the second threshold level or pressure levels generally serviceable by pressure release valves 108 (e.g., above 10 kPa) may be vented from battery pack 100 by deformable pressure release valves 112. In an example, a sudden onset of internal pressure may quickly reach the first pressure threshold pressure (e.g., 5 kPa) causing pressure release valves 108 to begin venting. If pressure continues to rise above levels serviceable by pressure release valves 108 (e.g., above 10 kPa or above 50 kPa), one or more of deformable pressure release valves 112 may mechanically deform, allowing further release of the internal pressure by creating an uncovered through opening in at least one of sidewalls 102 that enables egress from within module bays 105 to the environment surrounding housing 124. Each of these outputs may propagate throughout battery pack 100, as described further below. In some examples, a pressure buildup or flow exceeding a predetermined amount (e.g., above 10 kPa) may generate a warning for service of battery pack 100. For example, control circuitry may be arranged within battery pack 100 which comprises sensors (e.g., a water sensor configured to detect standing water within the battery pack assembly, a temperature sensor, a voltage sensor, and a pressure sensor). These sensors may be configured to provide at least one of data or instructions to generate at least one warning to a vehicle operator, a vehicle controller, or any combination thereof.

Battery pack 100 is substantially sealed against egress of environmental fluids or materials, apart from the fluid flows permitted by the pressure release valves 108, 110, and 112 to address increases of at least one of pressure or temperature within sidewalls 102. Sidewalls 102 and crossmembers 106 generally may create module bays 105 (e.g., individual enclosures within housing 124) around at least one of battery modules 104 (e.g., in some embodiments two of battery modules 104 as shown in FIG. 1A). While nine of battery modules 104 are illustrated being distributed amongst module bays 105, any number of modules 104 or module bays 105 may be employed (e.g., contingent on a desired power output of battery pack 100 or at least one of a weight or space constraint associated with the environment surrounding housing 124). Any or all of module bays 105 may contain any number of modules 104 that is convenient. Battery modules 104a-i may be comprised of a plurality of battery cells that are interconnected to generate an amount of electrical energy to be provided to a larger vehicle system (e.g., via at least one of a bus bar or at least one terminal connection). Battery modules 104a-i may be arranged vertically, horizontally, or may be stacked over each other depending on the available packing space of the structure for which the battery pack 100 is configured to provide electrical power. In some embodiments, battery modules 104 within one or more of module bays 105, and in some cases each of module bays 105, are positioned in a two-layer stack of battery cells. More specifically, as illustrated in FIG. 13, a lower layer of battery modules may be positioned beneath an upper layer of battery modules. In some embodiments, a cooling apparatus or layer may be positioned between.

Module bays 105 of battery pack 100 may permit fluid communication via one or more of vent passages 118 to permit flow of at least one of pressurized or heated fluid (e.g., gas or liquid) to at least one of pressure release valves 108, 110, or 112 for venting. Vent passages 118 may be bidirectional (e.g., enabling ingress and egress of at least one of heated or pressurized fluid between two of module bays 105) or multidirectional (e.g., enabling at least two of ingress, egress, or some other transitory propagation of at least one of heated or pressurized fluid between at least two of module bays 105 or between at least two of battery modules 104, based on either a lateral or vertical arrangement of the at least two of battery modules 104). Each of vent passages 118 are provided in laterally extending crossmembers 106 of battery pack 100. Additionally, the forwardmost module bay 105a may vent to the external environment surrounding housing 124 via at least one of pressure release valves 108, and rearward most module bay 105e may vent to the external environment surrounding housing 124 via at least one embedded iteration of pressure release valves 108.

Vent passages 118 are shown in FIG. 1A as extending between different combinations of module bays 104 and may generally freely allow fluid flow. In some embodiments, vent passages 118 may also be configured to enable passage of heated or pressurized fluid between vertically arranged battery modules 104 (e.g., as shown in FIG. 13). Accordingly, a thermal event or cell venting event in any of module bays 105 is communicated to an adjacent module bay of module bays 105. Further, to the extent this may cause a buildup of pressure within module bays 105 collectively, resulting in pressure release valves 108 collectively venting at least one of pressurized or heated fluid (e.g., gas, vapor, or liquid) to the external environment surrounding housing 124. Crossmembers 106 may provide structural support to at least one of battery pack 100 or a vehicle into which battery pack 100 is installed. Accordingly, vent passages 118 may generally facilitate a balance between the additional structural strength of battery pack 100 provided by crossmembers 106, while also facilitating an adequate vent flow out of battery pack 100. Vent passages 118 are positioned to facilitate vent flows along a floor structure (e.g., battery pack base 122 of FIG. 1B). At least some battery cells comprising battery modules 104 may be positioned such that venting from the cells tends to flow toward the floor structure. As such, venting from these cells may be facilitated by vent passages 118. At the same time, upper cells within the module may vent upwards within the module bays 104 toward a battery pack top or cover (e.g., battery pack cover 120).

FIG. 1B depicts an exploded view of battery pack 100 comprising battery pack cover 120 and battery pack base 122. Battery pack base 122 provides a bottom support or surface of battery pack 100, upon which at least one of battery modules 104, various sensors, vehicle system interfaces and the like may be supported or arranged. Battery pack cover 120 is configured to enclose module bays 105 from above. Battery pack cover 120 may be positioned over mica sheets which would aid in managing heat and pressurized gas generated by the operation of battery cells (e.g., comprising battery modules 104 of FIG. 1A) arranged in each of module bays 105. Each of battery pack cover 120 and battery pack base 122 may be fixedly attached to at least a portion or at least one of any or all of sidewalls 102 and crossmembers 106. In some embodiments, at least one pressure release valve may be arranged in a forward facing surface of sidewalls 102 while at least one pressure release valve may be arranged in at least one mounting location in a rear facing surface of sidewalls 102. In some embodiments, battery pack 100 may comprise at least one additional sidewall 102, that is not forward or rear facing, without at least one pressure release valve when at least one of a forward-facing wall of sidewalls 102 or a rear-facing wall of sidewalls 102 comprise enough deformable pressure release valves or plug valves to enable target pressurized or heated fluid egress rates.

Between each of module bays 105 is at least one of vent passages 118, which may be positioned towards or at the bottom of each of a plurality of crossmembers 106. The position of each of vent passages 118 in each respective crossmember of crossmembers 106 may depend on an optimal flow path for at least one of hot or pressurized fluid generated by the operation of battery modules 104, as determined based on operating parameters of a particular embodiment of battery pack 100. In some embodiments, at least one of vent passages 118 is unobstructed and at least one other of vent passages 118 is at least partially obstructed by various battery assembly components (e.g., coolant lines). In some embodiments, an inlet of at least one of vent passage 118, enabling the egress of gas out of one of module bays 105, is positioned higher than an outlet of the at least one vent passage, where a vent housing may be installed (e.g., a pressure release valve). In some embodiments, the inlet may be positioned lower than the outlet.

At least one of sidewalls 102 or crossmembers 106 may comprise an extruded material. At least one inlet or at least one outlet may comprise machined cutouts of the extruded material (e.g., to accommodate at least one of at least one vent passage 118 or at least one pressure release valve). Battery pack 100 may be formed by a method of manufacturing comprising extruding a rigid material to form at least one sidewall comprising an inner surface, an outer surface, and at least one guiding rib. The guiding rib may comprise a first end abutted to the inner surface, a second end abutted to the outer surface, and a profile structured to modify the trajectory of gas generated from inside the battery assembly. A center of the guiding rib is proximate to a vertical center of the sidewall such that the inlet and outlet maintain a target stiffness level of the inner surface and the outer surface. Once the at least one sidewall is formed, the at least one sidewall is arranged to form an enclosure at least partially. Within the enclosure, at least one battery module comprising a plurality of battery cells may be arranged. The sidewall may comprise a plurality of inlets and a corresponding plurality of outlets, wherein each of the plurality of inlets and corresponding outlets are adjacent to each other, to accommodate hot gas generated by a plurality of battery modules arranged in the enclosure. The described components and method of manufacturing may also be utilized to produce a battery pack, comprising at least one battery module comprising plurality of battery cells, and at least one sidewall arranged to encompass in part the battery module. The at least one sidewall may comprise an inner surface comprising an inlet opening configured to receive gas generated by the plurality of battery cells, an outer surface comprising an outlet opening configured to vent the gas, and a guiding rib that modifies a trajectory of gas between the inner surface and the outer surface.

Figure 2A:
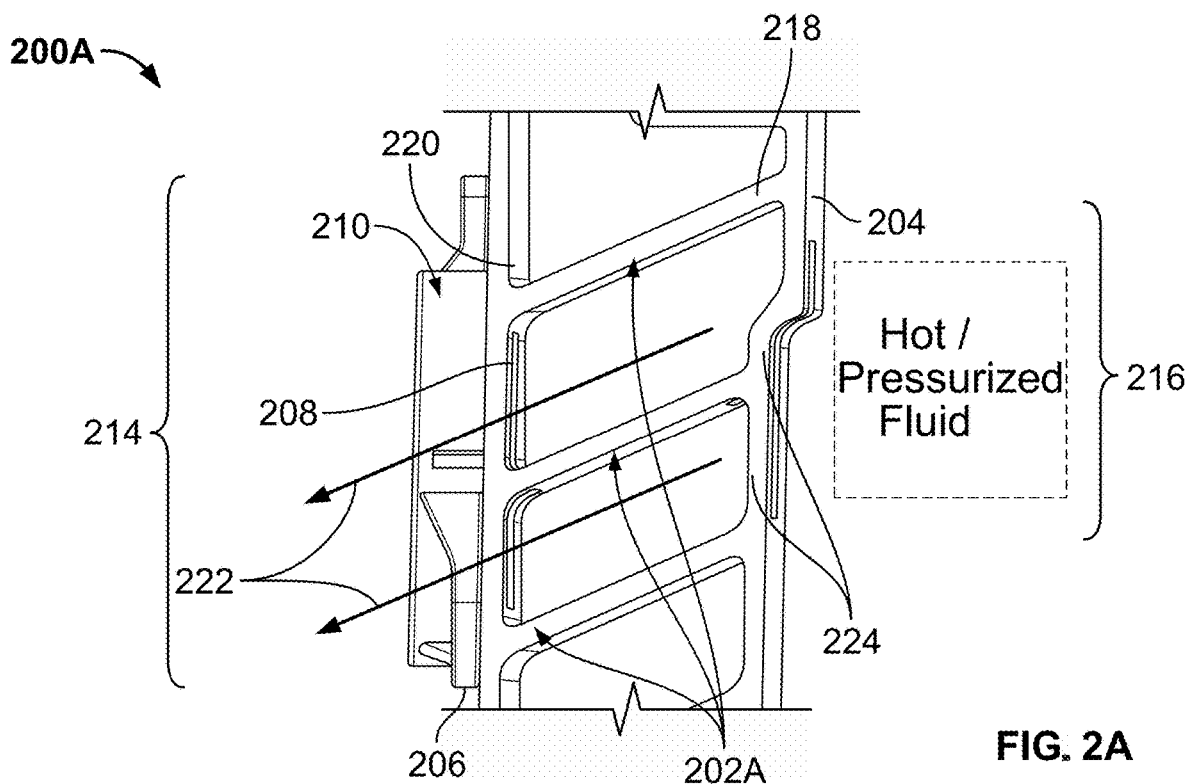
FIGS. 2A and 2B each depict a respective cross sectional view of a battery pack sidewall comprising multiple guiding ribs, in accordance with some embodiments of the disclosure.
Figure 2B:
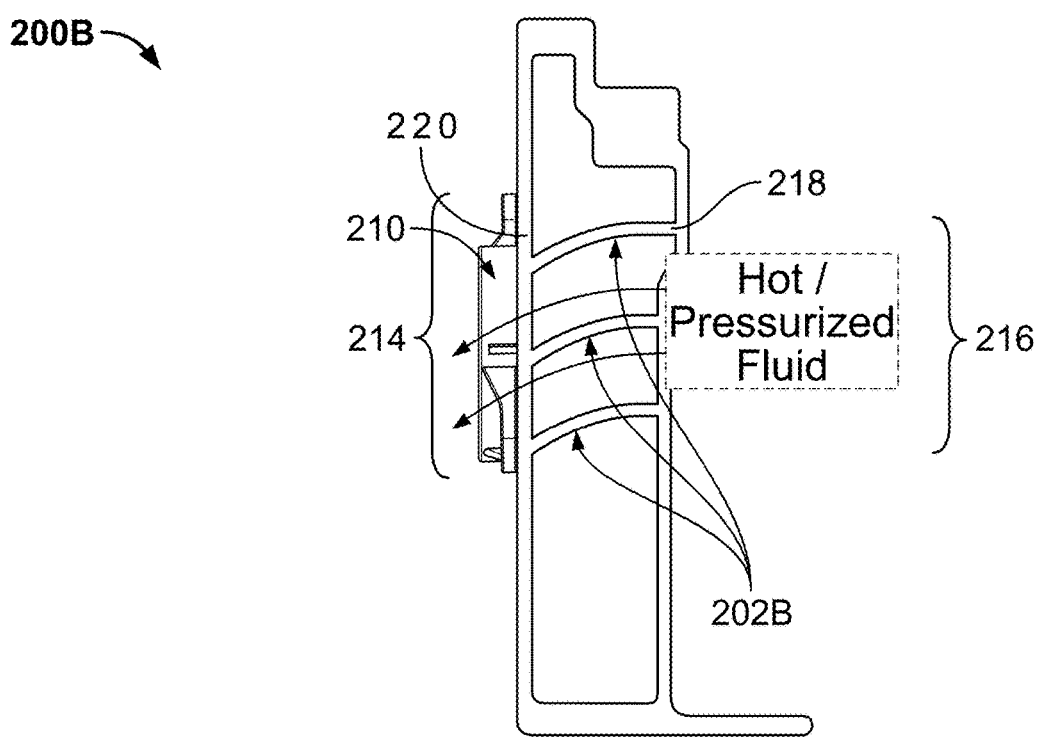

FIG. 2A depicts a cross sectional view of sidewall 200A comprised of angled guiding ribs 202A formed by material with a straight surface profile. FIG. 2B depicts a cross sectional view of sidewall 200B comprising curved guiding ribs 202B, in accordance with some embodiments of the disclosure. Each of sidewalls 200A and 200B may comprise more or fewer than the components or features depicted in FIGS. 2A and 2B. Each of sidewalls 200A and 200B may be incorporated into or may incorporate any or all of the components or features depicted in or described in reference to FIGS. 1 and 3-13. Additionally, each of sidewalls 200A and 200B may be assembled, developed, or manufactured based at least in part on any of the steps depicted in or described in reference to FIG. 14.

Figure 10A:
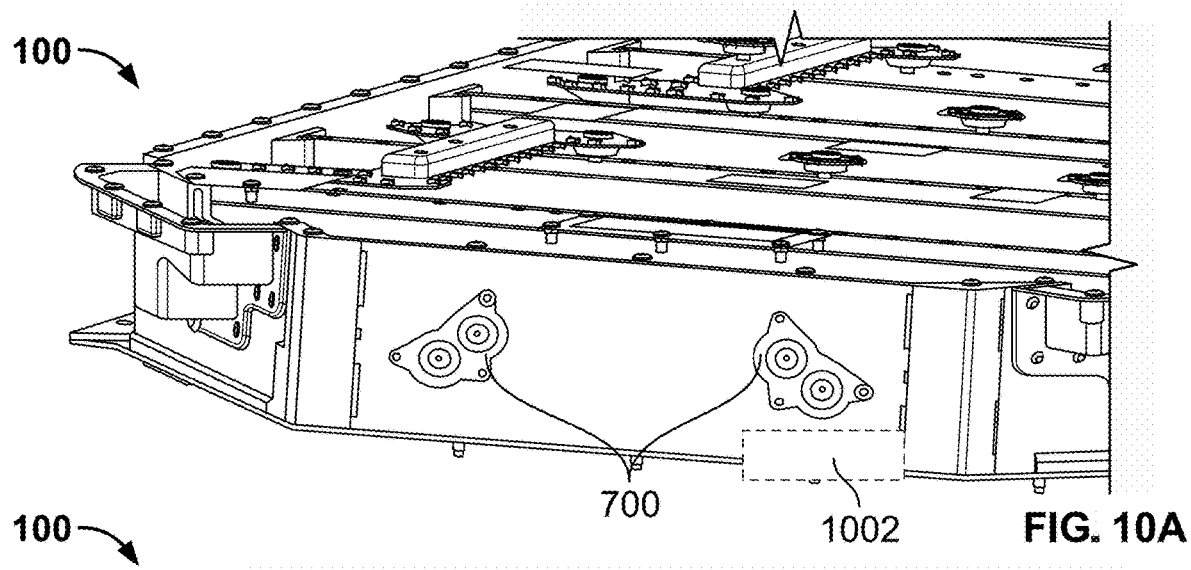
FIGS. 10A, 10B, and 10C each depict a respective view of an exemplary battery assembly with a plurality of pressure release valves, in accordance with some embodiments of the disclosure.
Figure 10B:
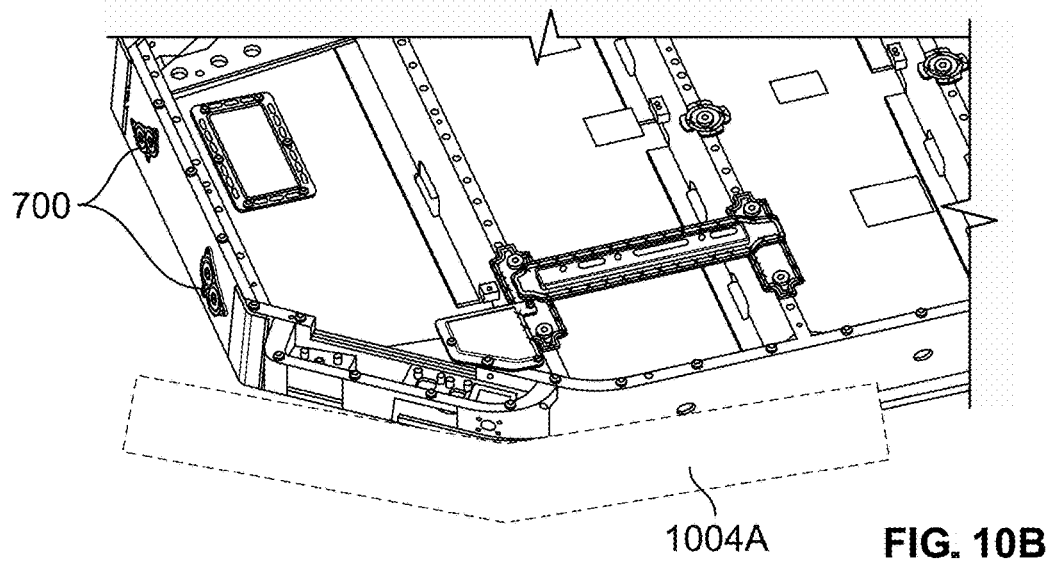
Figure 10C:
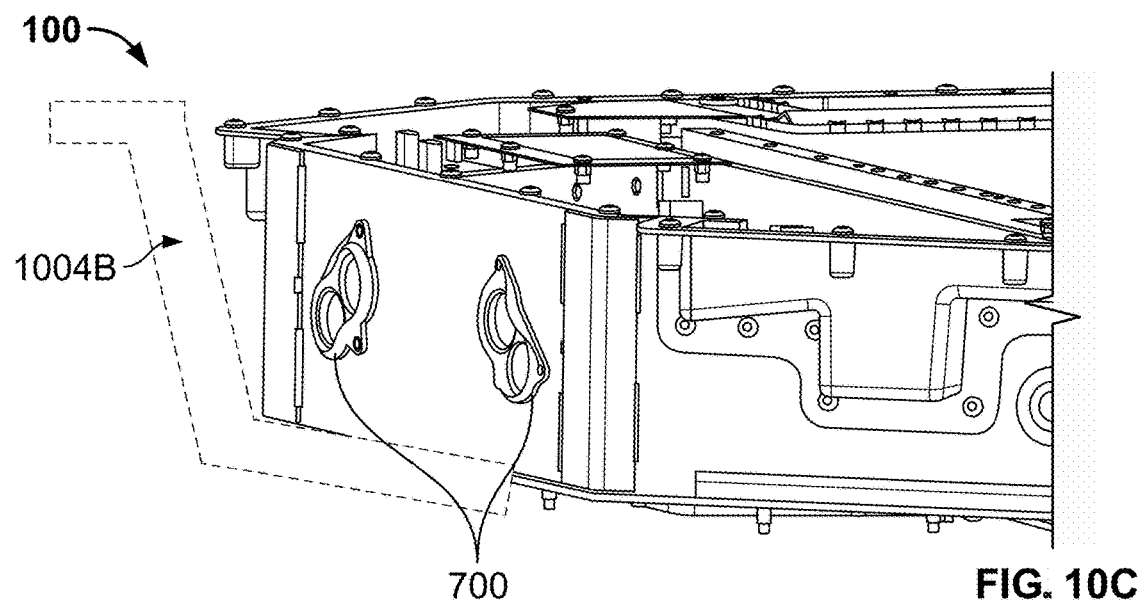

Sidewall 200A corresponds to any or all of sidewalls 102 of FIG. 1, and may be arranged to form housing 124. In some embodiments, sidewall 200A may be positioned below a vehicle occupant zone or may be positioned to avoid venting at least one of pressurized or hot fluid from inside a battery pack onto components surrounding the battery pack (e.g., as shown in FIGS. 10A, 10B, and 10C). Sidewall 200A comprises inner surface 204, outer surface 206, and angled guiding ribs 202A. Inner surface 204 is arranged and configured to receive at least one of hot or pressurized gas from inside a battery enclosure (e.g., module bays 105 of FIG. 1) as generated by the operation of at least one battery module (e.g., battery modules 104 of FIG. 1). Outer surface 206 comprises opening 208 configured to receive pressure release valve housing 210 affixed to outer surface 206 by interfacing with opening 208. Pressure release valve housing 210 when interfacing with opening 208 comprises outlet 214. Outlet 214 is configured to enable the egress of at least one of pressurized or hot gas after the pressurized or hot gas progresses through inlet 216 in response to a pressure differential between an environment in front of inlet 216 (e.g., corresponding to at least one of module bays 105 of FIG. 1) and an environment outside of outlet 214 (e.g., a vehicle underbody). For example, the environment in front of inlet 216 may correspond to an atmospheric pressure that is below a pressure to the right of inner surface 204 of FIG. 2. Between outer surface 206 and inner surface 204 are guiding ribs 202A, which provide upper and lower boundaries for guiding at least one of hot or pressurized fluid (e.g., gas, vapor, or liquid) from inlet 216 through outlet 214. In some embodiments, at least one of guiding ribs 202A comprises a straight profile (e.g., as shown in FIG. 2A) with first end 218 affixed to a surface that faces outlet 214. First end 218 is arranged vertically higher than second end 220, which is affixed a surface that faces inlet 216. The steepness of at least one of guiding ribs 202A and the profile prevents restriction of flow of at least one of hot or pressurized fluid by preventing turbulence in the flow of the hot or pressurized fluid and enables the hot or pressurized fluid to follow exit trajectory 222 instead of exit trajectory 224. Exit trajectory 222 prevents the egress of the hot or pressurized fluid towards a portion of the environment external to outer surface 206 that contains components and the like that cannot withstand exposure to the hot or pressurized gas (e.g., as shown in FIGS. 10A, 10B, and 10C). Exit trajectory 224 corresponds to an exit trajectory of the hot or pressurized fluid without the guiding ribs, which would result in the collection of the hot or pressurized fluid between inner surface 204 and outer surface 206. Additionally, exist trajectory 224 corresponds to a fluid flow that may result in exposure of components and the like external to outer surface 206 that should not be exposed to the hot or pressurized fluid.

Sidewall 200B comprises the components of sidewall 200A without guiding ribs 202A with a straight profile. Instead, sidewall 200B comprises curved guiding ribs 202B. The curved profile of guiding ribs 202B begins with first end 218 affixed to a surface that faces outlet 214. First end 218 is arranged vertically higher than second end 220, which is affixed a surface that faces inlet 216. The curved profile of guiding ribs 202B prevents restriction of flow of at least one of hot or pressurized fluid by preventing turbulence in the flow of the hot gas while guiding the exit trajectory of the hot or pressurized fluid away from certain areas external to the battery assembly (e.g., surrounding components as shown in FIGS. 10A, 10B, and 10C). The curve of the profile may be determined based on turbulence and restriction of flow target values for at least one of hot or pressurized fluid generated by the operation of battery modules (e.g., battery modules 104 of FIG. 1) within an enclosure (e.g., module bays 105 of FIG. 1). The change of direction of the fluid flow trajectory as defined by the curved profile of curved guiding ribs 202B from inlet 216 to outlet 214 enables transition of vectors defining the fluid flow without creating turbulence in the fluid flow. In some embodiments, either or both of sidewalls 200A or 200B comprises extruded material, wherein inlet 216 and outlet 214 comprise machined cutouts of the extruded material. In some embodiments, sidewalls 200A and 200B have at least one guiding rib, wherein a center of the guiding rib is proximate to a vertical center of inner surface 204 and outer surface 206, thereby maintaining a target stiffness level for either or both of sidewalls 200A and 200B. In some embodiments, at least one of sidewall 200A or 200B comprises a plurality of inlets 216 and outlets 214, wherein each of the plurality of inlets 216 and outlets 214 are adjacent to each other in at least one of sidewall 200A or 200B (e.g., as shown in FIG. 3).

Figure 3:
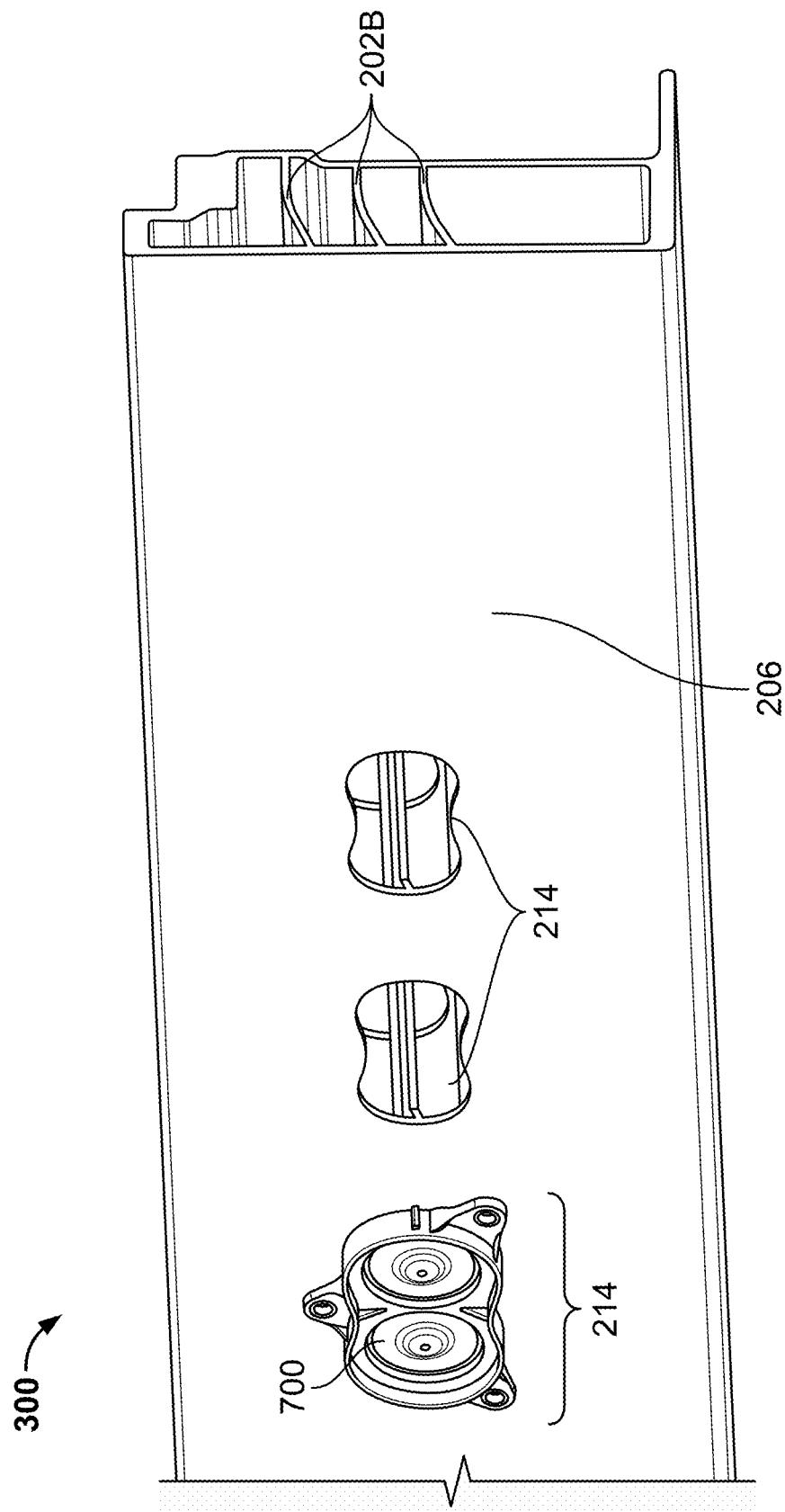
FIG. 3 depicts an outer surface of an exemplary battery pack sidewall with an embedded pressure release value, in accordance with some embodiments of the disclosure.
Figure 6A:
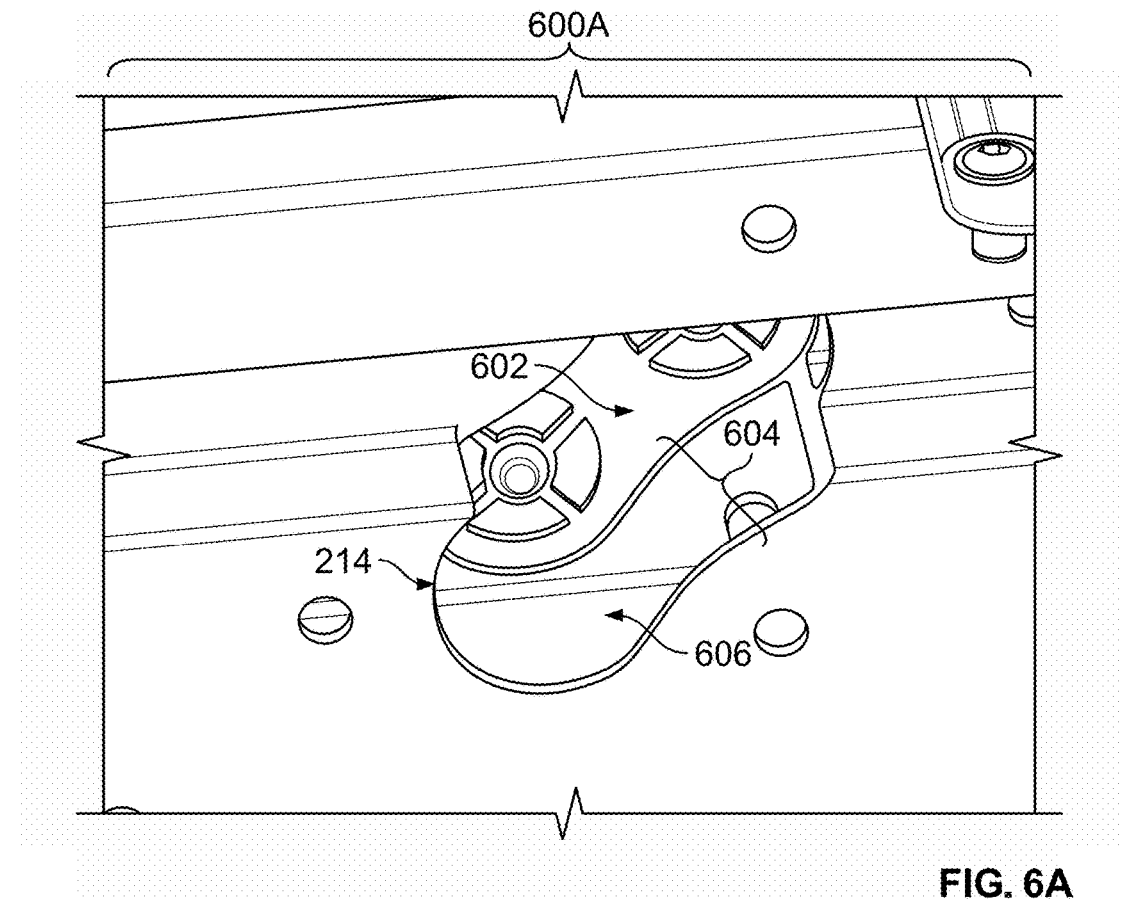
FIG. 6A depicts an example of a battery pack sidewall, with a pressure release valve embedded in the battery pack sidewall at an angle, comprising an opening configured to collect moisture, in accordance with some embodiments of the disclosure.
Figure 6B:
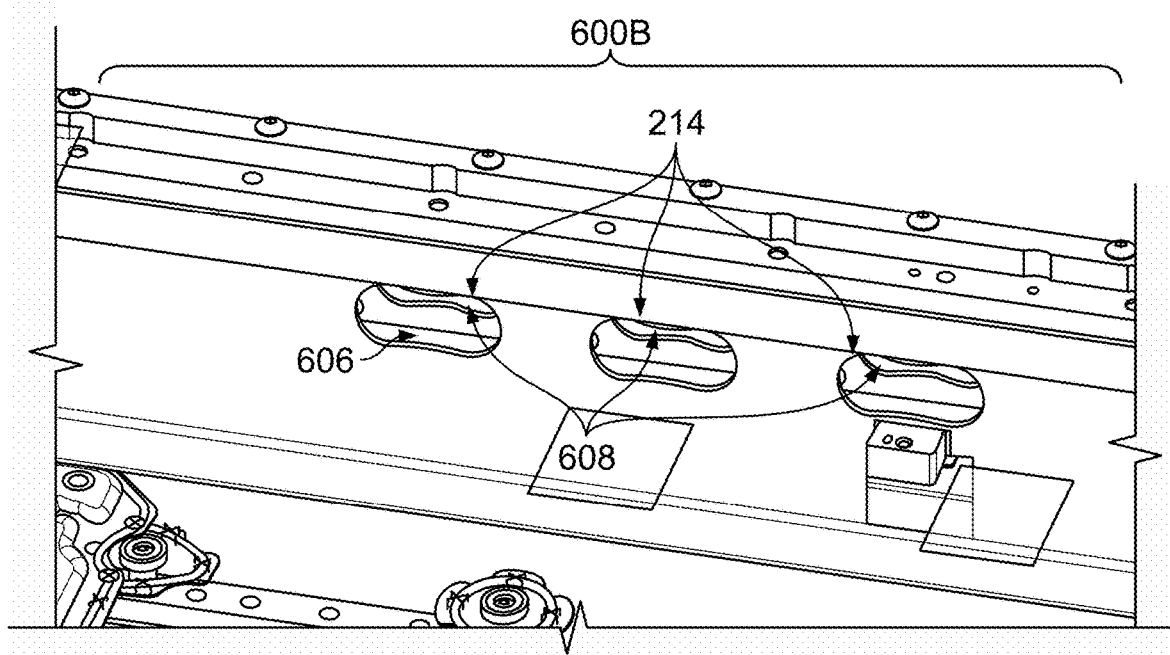
FIG. 6B depicts an example of a battery pack sidewall, with multiple pressure release valves embedded in the battery pack sidewall, in accordance with some embodiments of the disclosure.
Figure 7A:
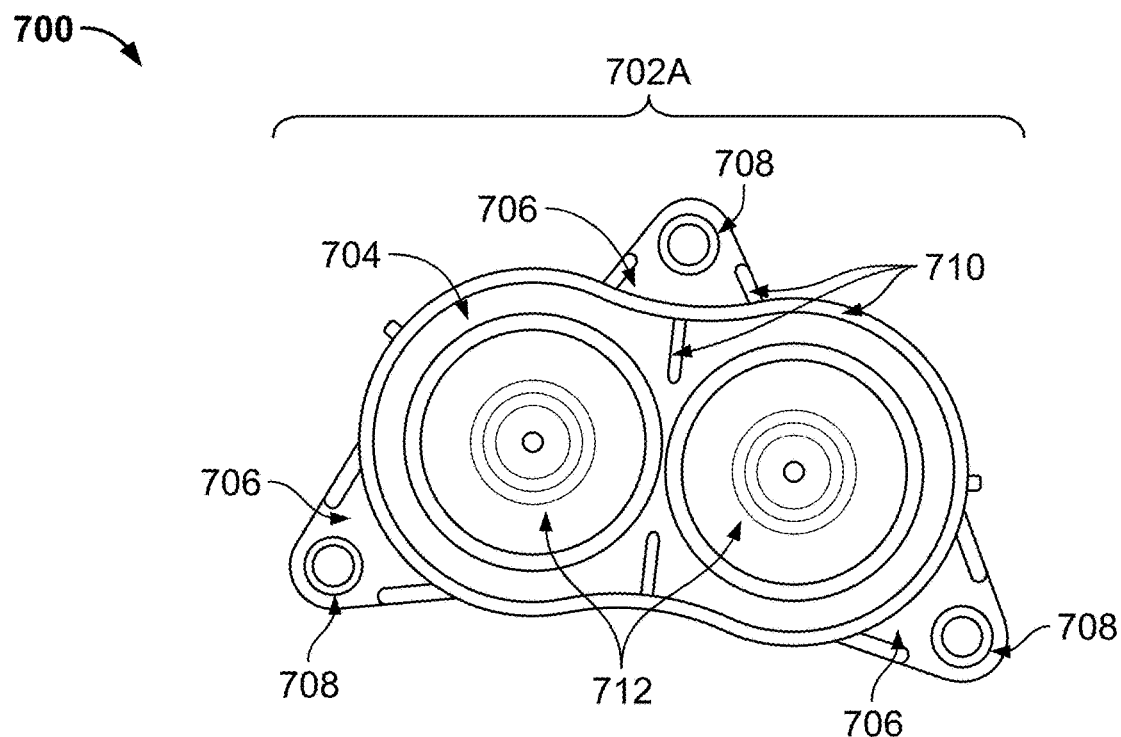
FIG. 7A depicts a top view of an exemplary dual membrane pressure release valve, in accordance with some embodiments of the disclosure.
Figure 7B:
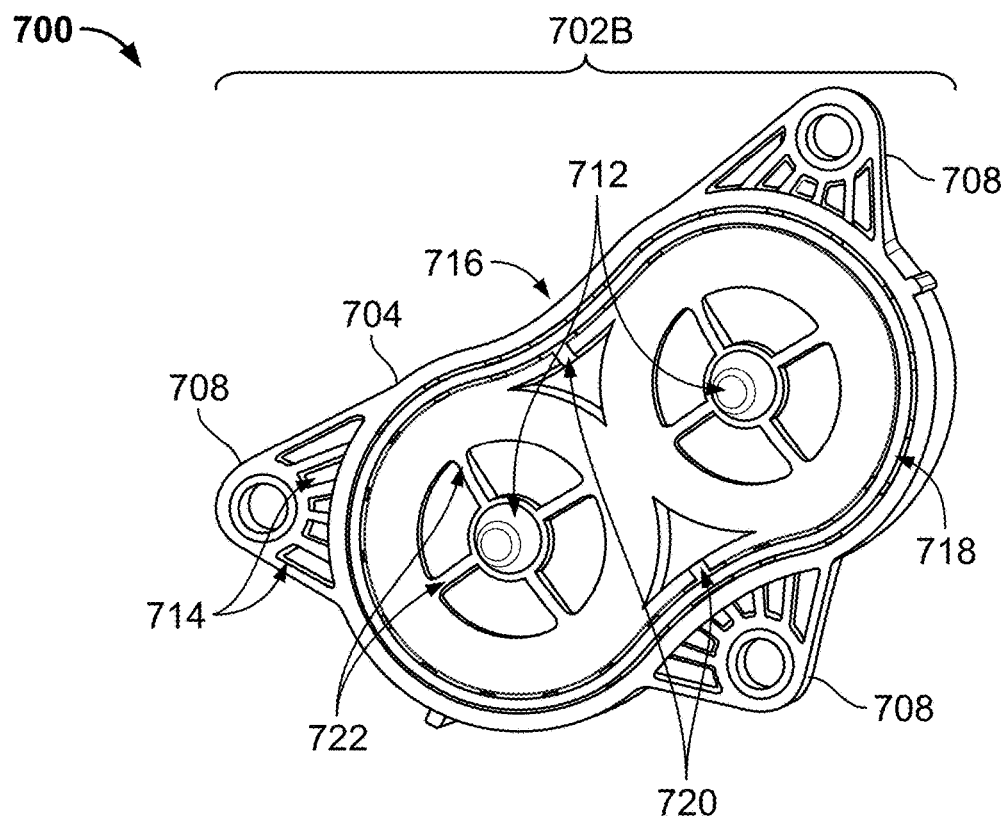
FIG. 7B depicts a bottom view of an exemplary dual membrane pressure release valve, in accordance with some embodiments of the disclosure.

FIG. 3 depicts sidewall assembly 300 comprising dual membrane pressure release valve 700 of FIGS. 7A and 7B, outlets 214 of FIG. 2, and curved guiding ribs 202B of FIG. 2, in accordance with some embodiments of the disclosure. Sidewall assembly 300 may comprise more or fewer than the components or features depicted in FIG. 3. Sidewall assembly 300 may be incorporated into or may incorporate any or all of the components or features depicted in or described in reference to FIGS. 1-2B and 4-13. Additionally, sidewall assembly 300 may be assembled, developed, or manufactured based at least in part on any of the steps depicted in or described in reference to FIG. 14.

Sidewall assembly 300 comprises a plurality of outlets 214, with dual membrane pressure release valve 700 of FIGS. 7A and 7B populating one of the plurality of outlets 214. Exposed outlets 214 are shown for illustration and may be covered by additional dual membrane pressure release valves or other valves described herein. In some embodiments, all of the pressure release valves may comprise a single large membrane in place of the two separate membranes as shown in FIGS. 9A and 9B. Sidewall assembly 300 also comprises a plurality of curved guiding ribs 202B of FIG. 2. In some embodiments, sidewall assembly 300 comprises guiding ribs 202A of FIG. 2A. In some embodiments, a combination of guiding ribs 202A and curved guiding ribs 202B may be utilized. Sidewall assembly 300 may be arranged or positioned anywhere around housing 124 of FIG. 1 by being arranged where any or all of sidewalls 102 are depicted in FIG. 1. Sidewall assembly 300 may at least partially form at least one of module bays 105 of FIG. 1. Dual membrane pressure release valve 700 may be structured to increase a material stiffness of sidewall assembly 300, considering the material stiffness of sidewall assembly 300 may be reduced by machining exposed outlets 214. In some embodiments, at least one of plurality of dual membrane pressure release valves 700 may populated each of exposed outlets 214. Each of the plurality of dual membrane pressure release valves 700 may correspond to a target stiffness value for the wall by being comprised of a housing that, when arranged within one of exposed outlets 214, increases the material stiffness of sidewall assembly 300 to a target stiffness value (e.g., the yield or ultimate strength of sidewall assembly 300 increased when at least one of exposed outlets 214 is populated by one of dual membrane pressure release valves 700). For example, sidewall 300 with exposed outlets 214 may have a reduction of at least 15% in the material stiffness of material comprising sidewall 300. When exposed outlets 214 are populated by dual membrane pressure release valves 700, the material stiffness of sidewall 300 may only be reduced by 5%, may return to an initial material stiffness, or may exceed the material stiffness of sidewall 300 before exposed outlets 214 are machined.

Figure 4:
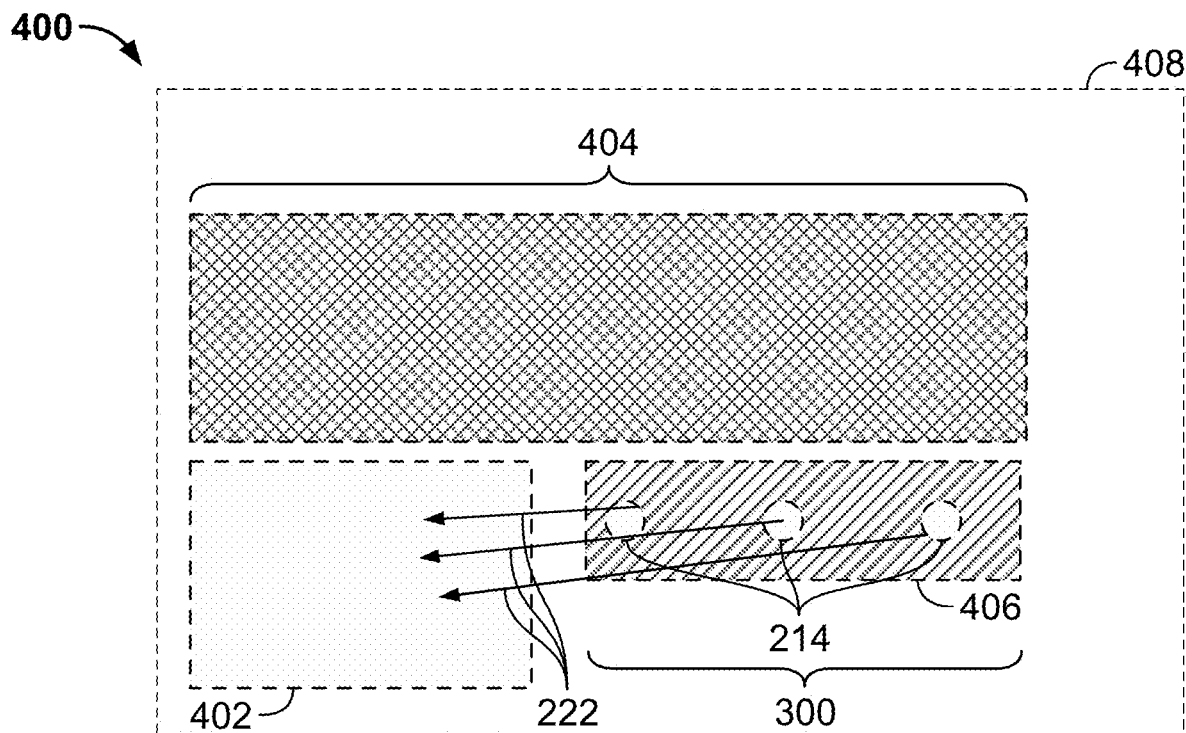
FIG. 4 depicts a side view of an exemplary battery assembly comprising at least one vented sidewall arranged to enable rapid egress of at least one of pressurized or hat gas generated within the battery assembly, in accordance with some embodiments of the disclosure.

FIG. 4 depicts view 400 with sidewall assembly 300 of FIG. 3, comprising at least one pressure release valve configured to enable rapid egress of at least one of pressurized or hot fluid generated within a battery assembly enclosed at least partially by sidewall assembly 300, arranged to vent the pressurized or hot fluid towards target egress area 402 and away from protected area 404, in accordance with some embodiments of the disclosure. View 400 may comprise more or fewer than the components or features depicted in FIG. 4. View 400 may be incorporated into or may incorporate any or all of the components or features depicted in or described in reference to FIGS. 1-3 and 5-13. Additionally, the components depicted in or described in reference to view 400 may be assembled, developed, or manufactured based at least in part on any of the steps depicted in or described in reference to FIG. 14.

As shown in view 400, sidewall assembly 300 comprises a plurality of outlets 214 of FIG. 2. Exit trajectory 222 corresponds to the exit trajectory of at least one of pressurized or hot fluid, as shown in and described in reference to FIG. 2. Exit trajectory 222 is shown as being directed towards target expulsion area 402. Target expulsion area 402 corresponds to an area which outlets 214 guides the at least one of pressurized or hot fluid towards without exposing components or areas around sidewall assembly 300 (e.g., areas around housing 124 of FIG. 1) that are not configured or structured to withstand the hot or pressurized fluid. For example, FIGS. 10A, 10B, and 10C each provide structural areas and components that may be arranged out of target expulsion area 402 to avoid exposure to the expelled pressurized or hot fluid. Sidewall assembly 300 is positioned or arranged below protected area 404.

Protected area 404 may correspond to a vehicle body, a vehicle frame, an occupant area, a cargo area, or any suitable form of enclosure, structural component, or assembly that is configured to interface or couple with a battery pack or battery assembly comprised of sidewall assembly 300. View 400 includes vehicle assembly 408, which is inclusive of all the elements of FIG. 4. Protected area 404 is not arranged or configured to receive any portion of exit trajectory 222 as protected area 404 is arranged above top lateral edge 406. Exit trajectory 222 may be enabled by at least one of a pressure release valve (e.g., a single or dual membrane valve as shown in FIGS. 7A-9B) or at least one guiding rib connecting surfaces forming sidewall assembly 300 (e.g., as shown in FIGS. 2A-3). Exit trajectory 222 enables the expulsion of at least one of pressurized or hot fluid downward award from top lateral edge 406. Additional single or dual membrane pressure release valves may be positioned in sidewall assembly 300 or a battery pack assembly comprised of housing 124 of FIG. 1 to optimize the amount of hot or pressurized fluid expelled during any given event which causes a buildup of pressurized gas within the battery pack assembly.

Figure 5:
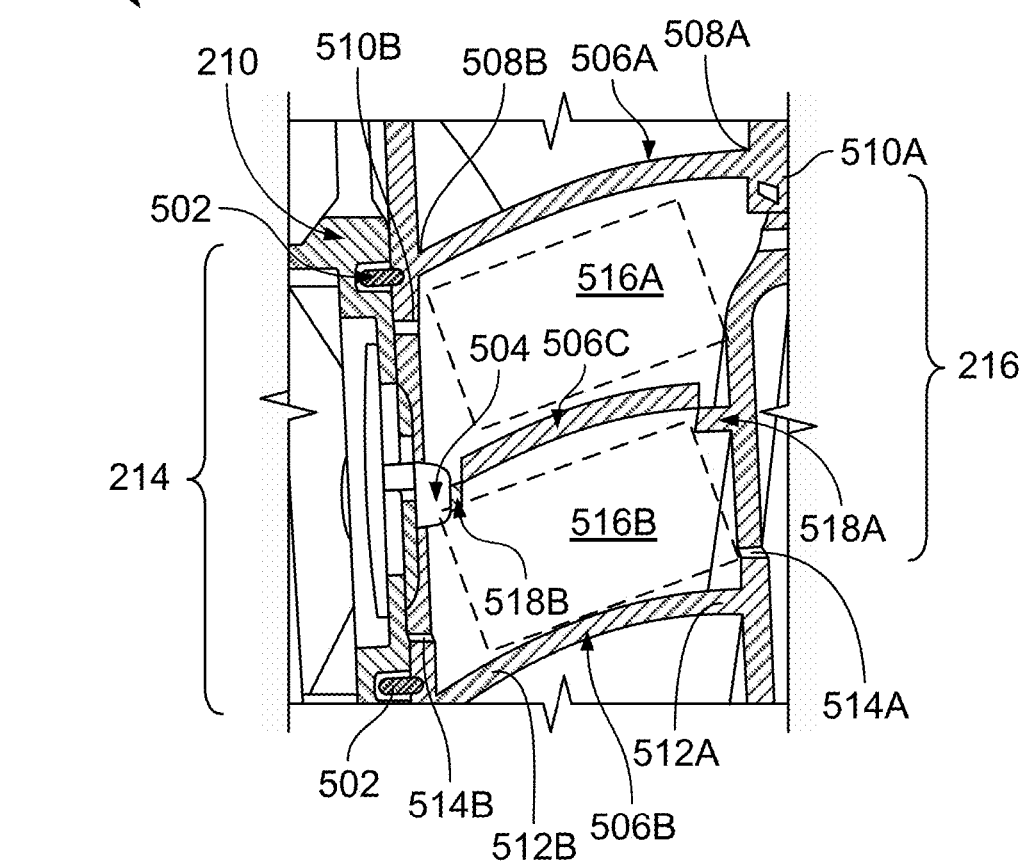
FIG. 5 depicts a cross sectional view of an exemplary sidewall comprising guiding ribs, in accordance with some embodiments of the disclosure.

FIG. 5 depicts a cross sectional view of sidewall assembly 500, in accordance with some embodiments of the disclosure. Sidewall assembly 500 may comprise more or fewer than the components or features depicted in FIG. 5. Sidewall assembly 500 may be incorporated into or may incorporate any or all of the components or features depicted in or described in reference to FIGS. 1-4 and 6A-13. Additionally, sidewall assembly 500 may be assembled, developed, or manufactured based at least in part on any of the steps depicted in or described in reference to FIG. 14.

Sidewall assembly 500 comprises first guiding rib 506A, wherein first end 508A of first guiding rib 506A is positioned towards or substantially at top edge 510A of the opening of inlet 216. Second end 508B of first guiding rib 506A is positioned towards or substantially at top edge 510B of the opening of outlet 214. Sidewall assembly 500 also comprises second guiding rib 506B, wherein first end 512A of second guiding rib 506B is positioned towards or substantially at bottom edge 514A of the opening of inlet 216. Second end 512B of second guiding rib 506B is positioned towards or substantially at bottom edge 514B of the opening of outlet 214. Sidewall assembly further comprises third guiding rib 506C. Third guiding rib 506C is positioned or arranged vertically between first guiding rib 506A and second guiding rib 506B. Third guiding rib 506C forms first channel 516A with first guiding rib 506A and second channel 516B with second guiding rib 506B, wherein each of first channel 516A and second channel 516B provide an open egress path for at least one of hot or pressurized fluid with a trajectory flowing towards an outer surface of inlet 216 and towards an inner surface of outlet 214.

Third guiding rib 506C is comprised of first recess 518A arranged towards the opening of inlet 216, wherein first recess 518A is configured to reduce turbulence corresponding to the trajectory of gas. First recess 518A may be at least one of configured to enable gas flow at target turbulence levels or incorporated for ease of manufacturing or assembly. By reducing inlet area with the recess, inlet 216 is configured to reduce a likelihood of restricted flow and improve efficiency of flow when a rapid egress of at least one of hot or pressurized fluid is required to maintain function of a battery assembly. The recess may also reduce the surface across which the flow of hot gas travels and also reduces the likelihood of turbulence in order to improve the efficiency of the egress of the at least one of hot or pressurized fluid. Third guiding rib 506C also is comprised of second recess 518B arranged towards the opening of outlet 214, wherein second recess 518B is configured to accommodate a rear portion of a valve affixed to the outer wall (e.g., membrane 504 in vent housing 210). Second recess 518B is arranged such that neither a surface nor edge of material forming second recess 518B contacts a rear portion of the pressure release valve comprising membrane 504. In some embodiments, an accommodating recess is not formed in third guiding rib 506C towards inlet 216.

Affixed an outer surface of sidewall assembly 500, corresponding to an outer surface of outlet 214, is vent housing 210. Vent housing 210 may comprise a membrane pressure release valve configured to deform when exposed to hot gas corresponding to a thermal runaway condition such that membrane 504 of the pressure release valve comprising vent housing 210 and membrane 504 are mechanically displaced (e.g., mechanically releasing a seal formed between the membrane and the housing), creating a large opening at outlet 214 for the rapid egress of at least one of hot or pressurized gas. Embedded in a groove of vent housing 210 is vent gasket 502. Vent gasket 502 is configured to mechanically seal against a surface of sidewall assembly 500 such that at least one of hot or pressurized gas is directed to outlet opening 514B. Additionally, vent gasket 502 is configured to prevent moisture from entering sidewall assembly 500 through vent housing 210.

FIG. 6A depicts first sidewall 600A and FIG. 6B depicts second sidewall 600B, in accordance with some embodiments of the disclosure. First sidewall 600A and second sidewall 600B may comprise more or fewer than the components or features depicted in FIGS. 6A and 6B. First sidewall 600A and second sidewall 600B may be incorporated into or may incorporate any or all of the components or features depicted in or described in reference to FIGS. 1-5 and 7A-13. Additionally, at least one of first sidewall 600A or second sidewall 600B may be assembled, developed, or manufactured based at least in part on any of the steps depicted in or described in reference to FIG. 14.

First sidewall 600A is comprised of angled vent housing 602 that is embedded (e.g., affixed) in an outer surface of first sidewall 600A. It will be understood that vent housing 602 is angled with respect to the outer surface (e.g., rotated about an axis normal to the outer surface), such that one side of vent housing 602 is lower than the other side of vent housing 602. First sidewall 600A comprises a pair of surfaces, the outer surface configured to receive angled vent housing 602 and an inner surface comprised of inlet 214. Between the outer surface and the inner surface is internal cavity 604 for collecting moisture such that it does not enter an enclosure partially formed by first sidewall 6001 (e.g., module bays 105 of FIG. 1). Collected moisture 606 corresponds to fluids that was able to enter between the inner and outer surfaces of first sidewall 600A. Preferably, collected moisture 606 should have a volume substantially equivalent to zero (e.g., no moisture enters first sidewall 600A or second sidewall 600B). However, it may be understood that during operation of a battery pack comprised of at least one of first sidewall 600A or second sidewall 600B various sealing interfaces may have imperfect sealing function and moisture may collect at various interfaces throughout the battery pack. As a result, the battery pack comprised of at least one of first sidewall 600A or second sidewall 600B may be configured to remain operable despite moisture collecting within the assembly. For example, a maximum level of allowable moisture (e.g., a maximum fluid ingress amount) in a battery enclosure may be 1.5 mm. Internal cavity 604 may be structured such that internal cavity 604 can store enough moisture collected from the environment around the battery pack or during operation of the battery pack that 1.5 mm of moisture is prevented from collecting in the enclosure at least partially formed by at least one of first sidewall 600A and second sidewall 600B (e.g., the height of the inner surface and outer surface forming the internal enclosure is configured such that a volume of water corresponding to at least 1.5 mm throughout the enclosure can be stored in the internal cavity). Second sidewall 600B includes openings in an outer surface for the installation horizontally aligned vent housing 608. Second sidewall 600B also comprises inlets 214, each corresponding to at least one of vent housings 608. First sidewall 600A may be arranged such that an outlet of angled vent housing 602A faces a forward portion of a vehicle assembly comprised of a battery pack comprised of first sidewall 600A. Second sidewall 600B may be arranged such that the outlets of horizontally aligned vent housings 608 face a rear portion of a vehicle assembly comprised of a battery pack comprised of second sidewall 600B. It will be understood that there may be more or fewer of at least one of venting openings or venting housings, depending on the desired egress rates of at least one of pressurized or heated fluid generated through the operation of a plurality of battery cells operating proximate to the depicted sidewalls (e.g., within module bays 105 of FIG. 1). The venting housings may comprise dual or single membrane pressure release valves, depending on the desired preload-sealing criteria of a particular battery assembly.

FIG. 7A depicts outer surface 702A of dual membrane pressure release valve 700 and FIG. 7B depicts inner surface 702B of dual membrane pressure release valve 700, in accordance with some embodiments of the disclosure. Dual membrane pressure release valve 700 may comprise more or fewer than the components or features depicted in FIGS. 7A and 7B. Dual membrane pressure release valve 700 may be incorporated into or may incorporate any or all of the components or features depicted in or described in reference to FIGS. 1-6 and 8A-13. Additionally, dual membrane pressure release valve 700 may be assembled, developed, or manufactured based at least in part on any of the steps depicted in or described in reference to FIG. 14.

Dual membrane pressure release valve 700 comprises housing 704 with rigid mounts 706. In some embodiments, rigid mounts 706 comprise features that extend from housing 704 and may interface with or at least partially comprise rigid mounts 706 such that dual membrane pressure release valve 700 may receive or be configured to interface with external deflectors. For example, each of rigid mounts 706 may corresponds to or may be comprised of extensions configured to form a snug fit interface (e.g., based on a compression fit specification that requires a press in load to be 50% or less of a pull out load once the interface is established by pressing in each of rigid mounts 706 into an opening in the sidewall) with an opening in the sidewall corresponding to the outline of housing 704 that is inclusive of the extensions or rigid mounts. Each of rigid mounts 706 incorporate at least one of rigid inserts 708 to reduce a transfer of torque or load from a fastener configured to interface with each of rigid mounts 706 to other features of housing 704 (e.g., to prevent mechanical deformation of housing 704 which may compromise sealing around dual membrane pressure release valve 700 by resisting a compression force generated by applying an installation torque to the fastener from transferring to the rigid mount). In some embodiments, rigid inserts 708 may be comprised of a metal material while housing 704 is comprised of a plastic material with a lower material strength than the metal material used for rigid inserts 708. Extending features 710 encompass each of membranes 712 to increase stiffness of housing 704 in order to prevent mechanical deformation (e.g., elastic or plastic) of housing 704.

Each of membranes 712 comprise an area corresponding to a target preload required to translate membranes 712 to enable the egress of at least one of hot or pressurized fluid from behind each of membranes 712 (e.g., as generated by the operation of battery modules in module bays 105 of FIG. 1). Membranes 712 are configured to create a seal against respective openings in housing 704. The openings correspond to an area formed at least partially by deformable struts 722. The target preload of each of membranes 712 may also correspond to target sealing levels to prevent the ingress of moisture behind the membranes (e.g., reducing an amount of fluid collected in FIG. 6). For example, the total area of membranes 712 may correspond to a maximum flow rate of the egress of at least one of pressured or heated fluid to prevent a buildup of pressure or heat in a battery pack comprised of sidewalls with at least one of dual membrane pressure release valve 700 embedded in an outer surface of at least one of the sidewalls. In order to balance the egress of hot gas against the need to prevent a threshold amount of moisture from entering the battery pack, the total area of membranes 712 is divided between two separate membrane structures such that each of membranes 712 corresponds to a high enough sealing preload to prevent the ingress of moisture without exceed a sealing preload that would prevent rapid egress of at least one of pressurized or heated fluid. The sealing preload corresponds to a force required to translate at least one of membranes 712 away from housing 704 to create an opening outer surface 702A. Forces acting on a battery pack comprised of dual membrane pressure release valve 700 may affect the integrity of a seal formed by each of membranes 712. For example, various forms of excitation to the surfaces of the battery pack caused by pressure differentials, vibrating mediums, or rapid changes in direction may comprise a seal by disrupting the contact surfaces along each of membranes 712. As a result, the battery pack may be configured to remain operational with some fluid ingress that is below a threshold fluid ingress that may affect operation of the battery pack.

Inner surface 702B is arranged to face opposite of outer surface 702A. As shown, rigid mounts 706 are arranged around the periphery of housing 704. Each of rigid mounts 706 are comprised of reinforcement vanes 714 which are structure to increase the material stiffness of each of rigid mounts 706, thereby reducing a risk of mechanical deformation or deflection during installation or articulation of membranes 712. Reinforcement valves 714 are arranged radially around openings in each of rigid mounts 708 to prevent deflection or deformation of rigid mounts 708. Rigid mounts 708 may comprise a first rigid mount arranged to protrude from a top side of housing 702 and further arranged laterally between membranes 712, a second rigid mount arranged to protrude from a bottom of housing 704 and further arranged to protrude from a first side of housing 704 (e.g., from a first bottom corner of housing 704), and a third rigid mount arranged to protrude from a bottom of housing 704 and further arranged to protrude from a second side of housing 704 (e.g., from a second bottom corner of housing 704).

Housing 704 is comprised of gasket groove 716 in which gasket 718 is arranged to create a seal between housing 704 and a surface of a battery pack sidewall in which housing 704 is installed or embedded. Gasket 718 is comprised of gasket protrusions 720, which are structured to secure gasket 718 in gasket groove 716 by increasing friction between gasket 718 and gasket groove 716. Gasket 718 encircles membranes 712, which are supported by deformable struts 722. Gasket 718 extends partially out gasket groove 716 such that when rigid mounts 708 are secured to a mounting sidewall, gasket 718 is partially compressed against the mounting sidewall and acts as a seal to prevent hot or pressurize fluid from passing between the mounting sidewall and housing 704. Gasket groove 716 may further comprise a pair of recesses between membranes 712 configured to accommodate gasket protrusions 720. Gasket 718 may comprise a plurality of additional protrusions structured to match a profile of gasket groove 716 in housing 704 such that gasket 718 remains in a secured position and maintains a continuous seal encircling both of membranes 712. Deformable struts 722 are configured to mechanically deform and release membranes 712 (e.g., the membranes are displaced or fall out of their respective housings) when exposed to thermal runaway conditions, thereby creating openings in housing 704 where membranes 712 are depicted in FIGS. 7A and 7B. The housing may comprise three rigid mounts as shown.

Figure 8A:
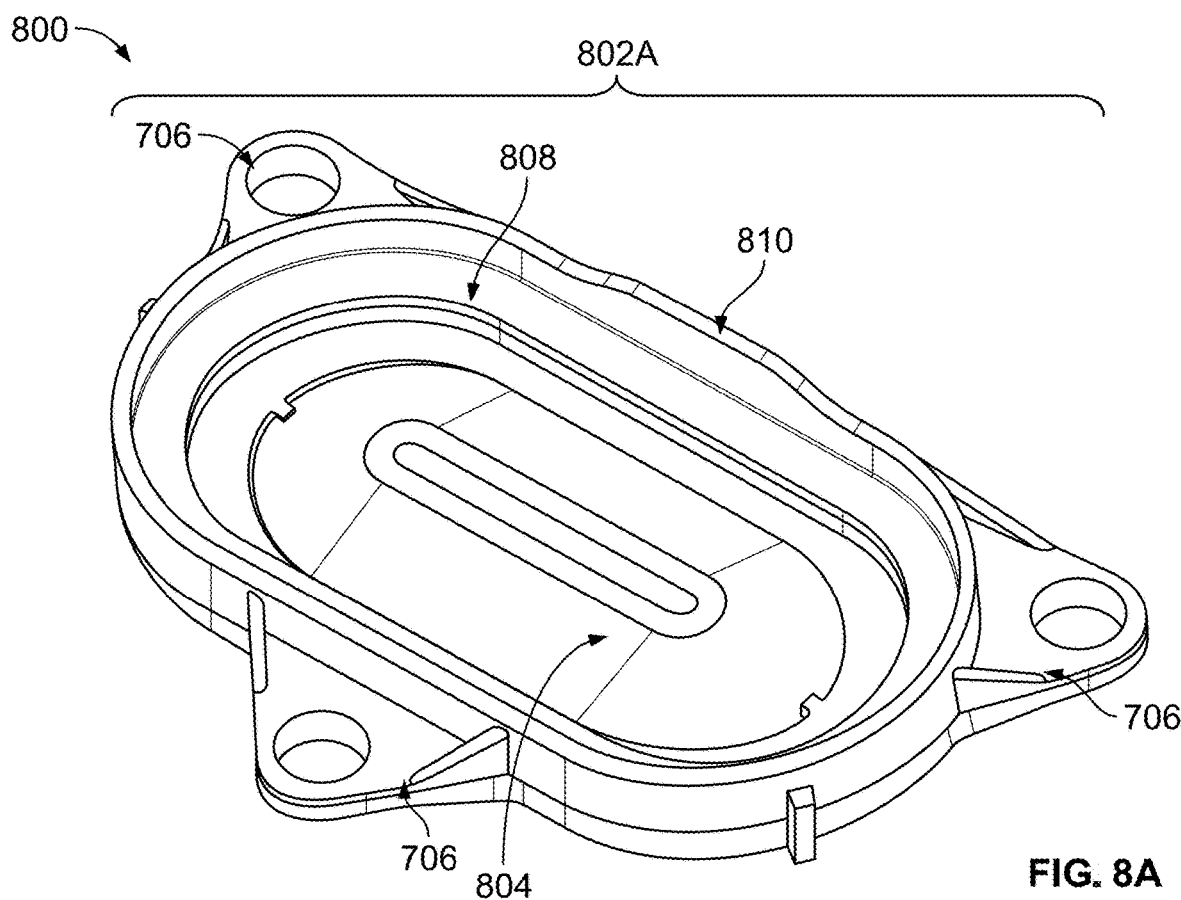
FIG. 8A depicts a top view of an exemplary single membrane pressure release valve, in accordance with some embodiments of the disclosure.
Figure 8B:
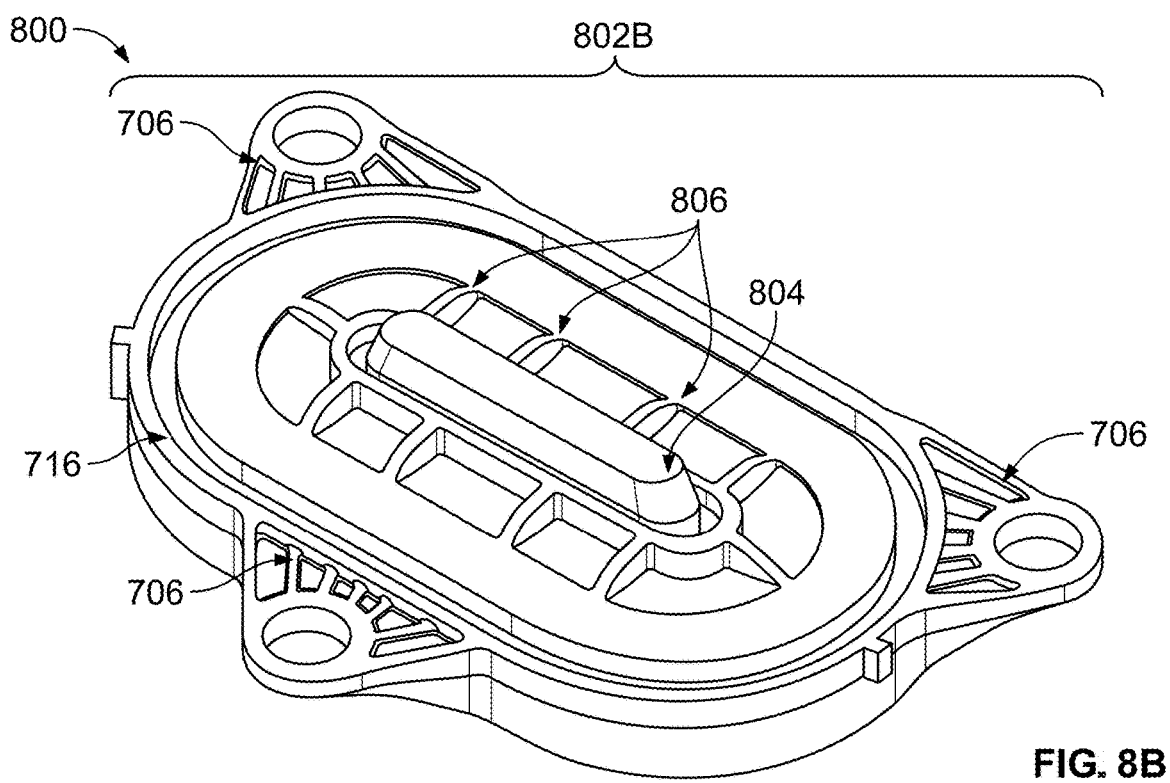
FIG. 8B depicts a bottom view of an exemplary single membrane pressure release valve, in accordance with some embodiments of the disclosure.

FIG. 8A depicts outer surface 802A of pressure release valve 800 and FIG. 8B depicts inner surface 802B of pressure release valve 800, in accordance with some embodiments of the disclosure. Pressure release valve 800 may comprise more or fewer than the components or features depicted in FIGS. 8A and 8B. Pressure release valve 800 may be incorporated into or may incorporate any or all of the components or features depicted in or described in reference to FIGS. 1-7B and 9A-13. Additionally, pressure release valve 800 may be assembled, developed, or manufactured based at least in part on any of the steps depicted in or described in reference to FIG. 14.

Pressure release valve 800 comprises extended membrane 804, which comprises an area which avoids a need to include a second membrane, in accordance with some embodiments of the present disclosure. Pressure release valve 800 is comprised of deformable struts 806 (e.g., as shown in FIG. 8B), rigid mounts 706 (e.g., configured to receive rigid inserts and comprised of reinforcement vanes as shown in FIG. 7), and gasket groove 716 configured to receive a sealing gasket. Additionally, housing 708 comprises at least one of stiffening extension 810 such that housing 708 corresponds to a material stiffness that does not compromise or create a weak point in a sidewall in which pressure release valve 800 may be installed.

The pressure release valves shown in FIGS. 7A-8B may be incorporated into a battery pack. The battery pack may comprise elements and the assemblies depicted in any or all of FIGS. 1-13. The battery pack may comprise at least one sidewall, wherein the sidewall is arranged to form an enclosure at least partially around a battery module, and wherein the at least one sidewall comprises at least one outlet. The battery module may be positioned laterally proximate to the at least one sidewall, wherein the battery module comprises a plurality of battery cells. The pressure release valves of FIGS. 7A-8B may comprise at least one venting structure (e.g., membranes 712 or 804), wherein the at least one venting structure is fixedly attached to the at least one outlet. The at least one venting structure may comprise a housing configured to be secured to the at least one sidewall, a first membrane positioned towards a first side of the housing, a second membrane positioned adjacent to the first membrane and positioned towards a second side of the housing, and a gasket structured to form a continuous seal between the housing and the sidewall.

FIG. 9A depicts battery pack 900 comprised of sidewall 902 with external surface 904, in accordance with some embodiments of the disclosure. FIG. 9B depicts inner surface 906 of sidewall 902, in accordance with some embodiments of the disclosure. Battery pack 900 may comprise more or fewer than the components or features depicted in FIGS. 9A and 9B. Battery pack 900 may be incorporated into or may incorporate any or all of the components or features depicted in or described in reference to FIGS. 1A-8B and 10A-13. Additionally, battery pack 900 may be assembled, developed, or manufactured based at least in part on any of the steps depicted in or described in reference to FIG. 14.

Sidewall 902 is shown with dual membrane pressure release valves embedded in external surface 904, in accordance with some embodiments of the present disclosure. Sidewall 902 comprises top lateral edge 912. Dual membrane valves 700 are arranged in positions configured optimize the egress of at least one of pressurized or heated fluid from inside battery pack 900. Each of dual membrane pressure release valves 700 is depicted as being rotated or moved towards the center of external surface 904 (e.g., at the depicted angle α or along the trajectories illustrated by the arrows), depending on where vehicle components around battery pack 900 are arranged or where the optimal egress position for the fluid is, considering the arrangement of battery cells or battery modules and other components inside battery pack 900 and surrounding structures. In some embodiments, single membrane pressure release valve 908 is embedded in angled sidewall 910, which is fixedly attached to external surface 904 of sidewall 902 to at least partially form at least one enclosure for battery cells (e.g., module bays 105 of FIG. 1). An additional single membrane pressure release valve (not shown) may also be embedded in an angled sidewall fixedly attached on an opposite side of external surface 904 of sidewall 902 to balance the release of at least one of pressurize or heated fluid across sidewall 902. The cumulative area of single membrane pressure release valve 908 and dual membrane pressure release valves 700 may equal or correspond to the cumulative area of pressure release valves installed in a rear-facing sidewall of the battery assembly. For example, there may be up to a 5% difference in area between the cumulative area of single membrane pressure release valve 908 and the cumulative area of dual membrane pressure release valves 700. In some embodiments, the vehicle assembly may result in a functional need for either sidewall 902 or a rear-facing sidewall arranged to face opposite of external surface 904 to serve as a primary egress opening for at least one of pressurized or heated fluid, depending on which sidewalls are arranged to have outlets which are directed towards target expulsion area 402 of FIG. 4. Dual membrane pressure release valves 700 are optimally positioned on external surface 904 such that the stiffness of sidewall 902 maintains a target stiffness (e.g., near the vertical center of sidewall 902).

FIGS. 10A, 10B, and 10C each depict battery pack 100 with dual membrane pressure release valves 700 embedded in a sidewall, in accordance with some embodiments of the disclosure. Battery pack 100 may comprise more or fewer than the components or features depicted in FIGS. 10A, 10B, and 10C. Battery pack 100 may be incorporated into or may incorporate any or all of the components or features depicted in or described in reference to FIGS. 1A-9B and 11A-13. Additionally, battery pack 100 may be assembled, developed, or manufactured based at least in part on any of the steps depicted in or described in reference to FIG. 14.

As shown in FIG. 10A, dual membrane pressure release valves 700 are positioned such that when the pressure release valves enable the egress of at least one of pressurized or heated fluid from within battery pack 100, the trajectory of the expelled fluid does not get influenced or modified by the depicted features surrounding battery pack 100. Additionally, the positioning of dual membrane pressure release valves 700 is influenced by impact area 1002. Impact area 1002 corresponds to a portion of the external surface of battery pack 100 that is structured to receive impacts of surrounding components in response to a vehicle impact event or other related event (e.g., an event where a rapid deceleration occurs resulting in the deformation of vehicle components surrounding battery pack 100). Dual membrane pressure release valves 700 are arranged such that the target stiffness of the sidewall of battery pack 100 is not compromised by the presence of the pressure release valve and neither of dual membrane pressure release valves 700 is subjected to a direct component impact in the aforementioned event or events. As shown in FIGS. 10A, 10B and 10C, dual membrane pressure release valves 700 are mounted with their inboard sides rotated upwards (e.g., at least one rigid mount is arranged closer to a top lateral edge of a sidewall of battery pack 100 than at least one other rigid mount), which raises the lowest point (e.g., the lowest rigid mount) of the pressure release valves. In some embodiments, the lowest point of the pressure release valves is raised to provide clearance between an edge of either of dual membrane pressure release valves 700 or the outermost edge of impact area 1002.

In FIG. 10B, vehicle component profile 1004A is positioned relatively close to a periphery of sidewalls forming battery pack 100. There may be additional clearance between the forward-facing portion of battery pack 100 and vehicle component profile 1004A to ensure impact area 1002 is not subjected to unexpected impacts from surrounding components. Accordingly, the location of dual membrane pressure release valves 700 on the forward-facing portion of the sidewall enables expelled fluid to substantially avoid vehicle component profile 1004A. In FIG. 10C, vehicle component profile 1004B extends forwards from underneath a front sidewall of battery pack 100 (e.g., a z-bracket that provides support for the front of the battery assembly). Vehicle component profile 1004B is centered with respect to battery pack 100 and the lateral locations of dual membrane pressure release valves 700 are selected such that expelled hot gas substantially avoids the component occupying a space substantially similar to vehicle component profile 1004B.

Figure 11A:
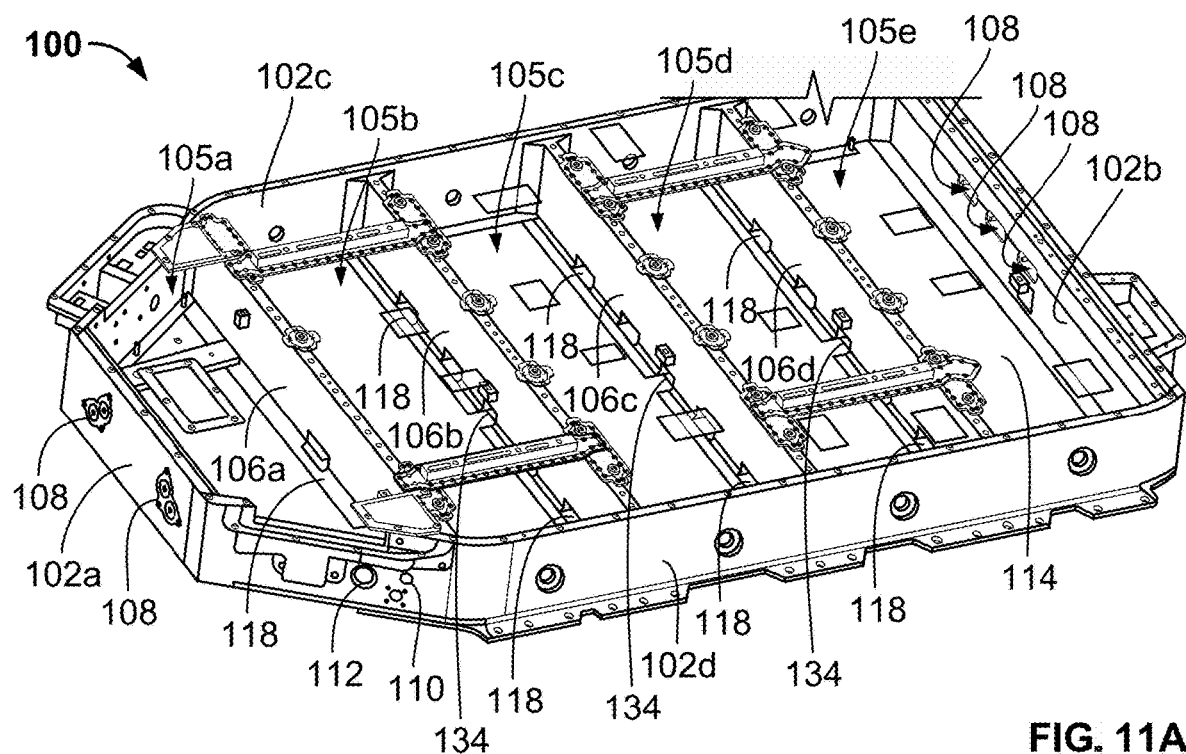
FIGS. 11A and 11B each depict a respective top view of an exemplary battery assembly with a plurality of battery module bays, in accordance with some embodiments of the disclosure.
Figure 11B:
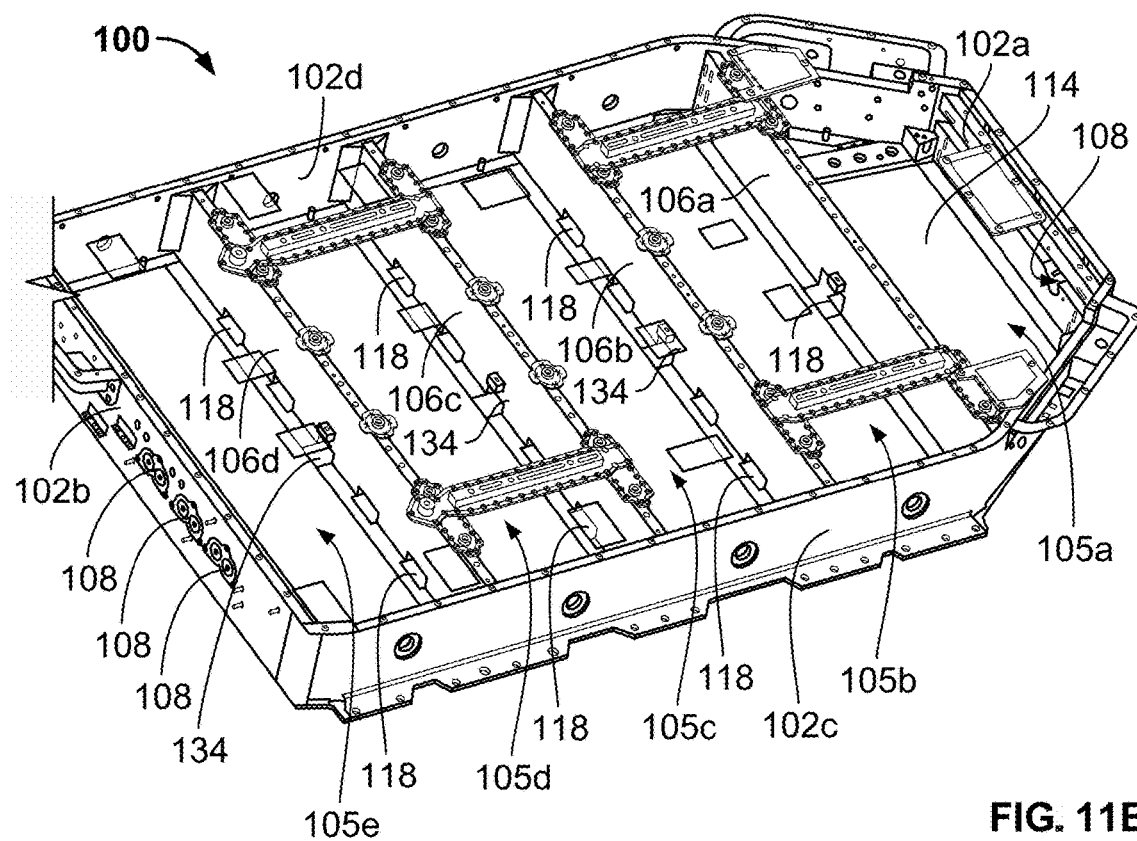

FIGS. 11A and 11B depict a pair of views of battery pack 100 of FIG. 1, in accordance with some embodiments of the disclosure. Battery pack 100 may comprise more or fewer than the components or features depicted in FIGS. 11A and 11B. Battery pack 100 may be incorporated into or may incorporate any or all of the components or features depicted in or described in reference to FIGS. 1A-10C, 12, and 13. Additionally, battery pack 100 may be assembled, developed, or manufactured based at least in part on any of the steps depicted in or described in reference to FIG. 14.

Multidirectional vent passages 118 remain generally unobstructed by components of battery pack 100, and as a result freely permit fluid exchanges between adjacent bays 105 of the battery pack 100 at least along floor structure 114. Additional nominal fluid exchange between bays 105 may nevertheless occur via other pathways within battery pack 100. For example, coolant passages extend in a longitudinal direction through battery pack 100, extending through corresponding crossmember apertures 134 of one or more of crossmember(s) 106. Crossmember apertures 134 may generally fit closely around coolant passages 132, permitting a nominal amount of fluid exchange between adjacent bays 105. Further, a tunnel structure of battery pack 100 may extend longitudinally along a lateral center of battery pack 100, resulting in additional nominal pathways for fluid exchange between bays 105 (e.g., over a top part of the crossmembers 106 along cover 116 which is not shown in FIGS. 11A and 11B). In contrast to these pathways for nominal fluid exchange between bays 105, multidirectional vent passages 118 provide a relatively unobstructed and direct path for fluid exchange between bays 105. Additionally, to the extent modules 104 may have batteries/cells venting downward toward floor structure 114, multidirectional vent passages 118 provide a direct path between bays 105 coinciding with the direction of venting of these module (s) 104.

The bidirectional vent passages may have any shape or configuration that is convenient. Multidirectional vent passages 118 may be positioned at a lower portion of each of bays 105, adjacent floor structure 114 of battery pack 100. Multidirectional vent passage 118 may be relatively wider along floor structure 114 (e.g., having a width at least twice as great as a height thereof). One or more of the bays 105, or even each of bays 105 of battery pack 100, may include two or more adjacent battery modules 104, with crossmembers 106 on either side of modules 104 defining respective multidirectional vent passages 118. Any number of crossmembers 106 may be employed, defining any number of bays 105, as noted above. Multidirectional vent passages 118 of crossmembers 106 are each aligned longitudinally, thereby providing a straight and unobstructed flow path between each of bays 105. Additionally, the battery modules 104 within one or more of the bays, or within each bay 105 of battery pack 100, may be installed within battery pack 100 such that modules 104 are raised above floor structure 114, thereby allowing fluid flow within each bay 105 along floor structure 114 beneath battery modules 104.

The restricted flow paths to a number of pressure release valves 108 at the front and rear locations may facilitate venting from battery pack 100 at desired locations (e.g., with respect to a vehicle in which battery pack 100 is installed). For example, the locations of pressure release valves 108 may correspond to locations of the vehicle where a flow of heat or pressure may be relatively unnoticed by passengers, or otherwise may not impact vehicle systems. In some embodiments, at least one pressure release valve is embedded in a first sidewall positioned in a first portion of a vehicle comprised of battery pack 100, wherein the first portion may be a front portion. In some embodiments, at least one pressure release valve is embedded in a second sidewall positioned in a second portion of the vehicle, wherein the second portion may be a rear portion. Either the first or the second portion may be either a front or a rear portion. By way of example, rearward pressure release valves 108 may vent to an area outer to the vehicle and beneath the vehicle, near a front or rear cargo area, cargo box, or the like. Accordingly, passengers exiting the vehicle or standing near the vehicle may be unlikely to notice the venting. Focusing the venting locations to the front and rear of battery pack 100 may also facilitate redirection of a vent flow or heat to areas of the vehicle away from temperature-sensitive areas or materials. In some examples, the vehicle may have deflectors or other devices for redirecting vent flow form the battery pack 100.

The restricted flow paths for venting battery pack 100 may also facilitate consistent venting of valves 108 at a desired pressure level. More particularly, relatively larger vents may typically be more difficult to control with respect to providing consistent venting at a desired pressure level. For example, for larger pressure release valve structures it may be difficult to achieve a sufficient preload that will permit venting at the appropriate internal pressure, prevent venting at lower pressures where venting is not necessary, and also sufficiently seal against external contaminants such as water. Accordingly, in the example illustrations shown, there are multiple pressure release valves 108 along the front and rear venting locations. As a result, the pressure release valves 108, and in particular moveable umbrella structures 109 are each relatively small and thus may more consistently provide venting at a desired pressure. As noted above, pressure release valves 108 may be configured to vent in response to an internal pressure of 5 kPa.

FIG. 11B depicts battery pack 100 comprising module bays 105 formed by crossmembers 106, each comprising gas egress openings in accordance with some embodiments of the present disclosure. Also depicted is rear-facing sidewall 102*b* comprising a plurality of dual membrane pressure release valves 108. Dual membrane pressure release valves 108 are embedded in the rear-facing sidewall 102*b* and may be laterally aligned. In some embodiments, three pressure release valves comprise the plurality of pressure release valves. Each of the three pressure release valves are distanced by an equal amount from each other and arranged to enable the egress of at least one of pressurize or heated fluid from inside module bays 105 such that the egress results in fluid trajectories that guide the fluid around critical vehicle components. In some embodiments rear facing sidewall 102*b* may comprise one or more guiding ribs, as described above, to modify the exit trajectory of gas that enters sidewalls 102 and passes through dual membrane pressure release valves 108. Rear facing dual membrane pressure release valves 108 may be configured to complement at least one pressure release valve embedded in forward-facing sidewall 102a, which is arranged at an opposite end of battery pack 100. The cumulative area of the pressure release valves may correspond with target gas egress rates and a target gas egress direction (e.g., towards the forward-facing sidewall or towards the rear-facing sidewall to avoid venting gas in the direction of critical vehicle components or occupant arears).

Figure 12:
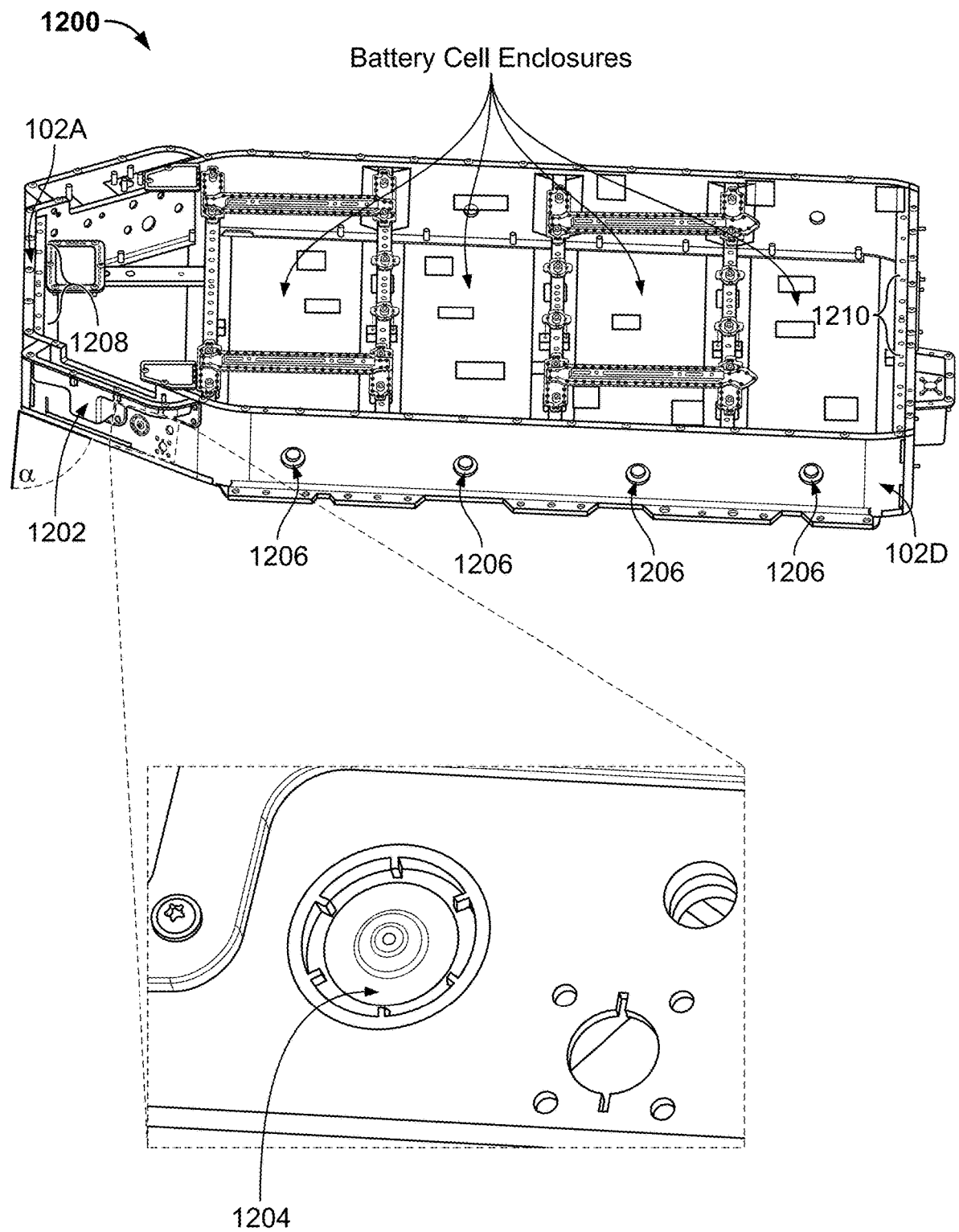
FIG. 12 depicts an exemplary battery assembly comprised of a plurality of battery module bays and a plurality of pressure release valves, in accordance with some embodiments of the disclosure.

FIG. 12 depicts battery pack 1200, in accordance with some embodiments of this disclosure. Battery pack 1200 may comprise more or fewer than the components or features depicted in FIG. 12. Battery pack 1200 may be incorporated into or may incorporate any or all of the components or features depicted in or described in reference to FIGS. 1A-11B and 13. Additionally, battery pack 1200 may be assembled, developed, or manufactured based at least in part on any of the steps depicted in or described in reference to FIG. 14.

Battery pack 1200 is comprised of sidewall 102D of FIG. 1, and angled sidewall 1202 (e.g., angled at angle α relative to a plane defined by forward-facing sidewall 102A that enables the egress of gas away from critical vehicle components), which at least partially form a plurality of battery cell enclosures (e.g., module bays 105 of FIG. 1). Single membrane pressure release valves 1204 may be installed in each of single membrane pressure release valve outlets 1206. In some embodiments, there is at least one single membrane pressure release valve per sidewall per battery cell enclosure. In some embodiments, valve outlets 1206 are not present (e.g., having less than four present or zero) along the sides of battery pack 1200 as the venting enabled by forward-facing sidewall pressure release valves 1208 and rear-facing sidewall pressure release valves 1210 enable adequate venting of battery pack 1200. In some embodiments, dual membrane pressure release valves may be utilized, depending on target gas egress rates balances against moisture sealing requirements and sidewall stiffness requirements. Also depicted are forward-facing sidewall pressure release valves 1208 and rear-facing sidewall pressure release valves 1210. Each of the forward and rear-facing pressure release valves are configured to complement the pressure release valves of the opposite facing sidewall. The cumulative area of the pressure release valves may correspond with target gas egress rates and a target gas egress direction (e.g., towards the forward-facing sidewall or towards the rear-facing sidewall to avoid venting gas in the direction of critical vehicle components or occupant arears).

FIG. 13 shows battery pack 1300, in accordance with some embodiments of the disclosure. Battery pack 1300 may comprise more or fewer than the components or features depicted in FIG. 13. Battery pack 1300 may be incorporated into or may incorporate any or all of the components or features depicted in or described in reference to FIGS. 1A-12. Additionally, battery pack 1300 may be assembled, developed, or manufactured based at least in part on any of the steps depicted in or described in reference to FIG. 14.

FIG. 13 shows a cross section of battery pack 1300 which enables the merging of fluid trajectories 1310 characterized by the arrows between battery modules 104, based on the battery assembly configuration which as shown may include vertically stacked battery modules, to define target outlet location 1302 in a sidewall at least partially defining a battery enclosure (e.g., module bays 105). Target outlet location 1302 is configured to be at a heigh in sidewall 102 corresponding to a maximum flow rate. For example, target outlet location 1302 may be at a height on sidewall 102 that is between 20% and 80% of the overall height of sidewall 102. Battery pack 1300 comprises battery pack cover 1304 and battery pack base 1306 fixedly attached to at least one of enclosure crossmember 106 and at least one of sidewall 102. Crossmember 106 may comprise gas egress opening 1308 corresponding to a fluid flow trajectory that contributes to fluid trajectories 1310. Sidewall 102 may comprise a venting structure at an optimal height corresponding to target outlet location 1302. The venting structure may comprise a plurality of pressure release valves (e.g., two pressure release valves angled on a forward-facing end sidewall, or three pressure release valves laterally aligned on a rear-facing end sidewall). The cumulative area of the pressure release valves may correspond with target gas egress rates and a target gas egress direction (e.g., towards the forward-facing sidewall or towards the rear-facing sidewall to avoid venting gas in the direction of critical vehicle components or occupant arears). The venting structure may be positioned in sidewall 102 at an optimal height based on fluid trajectories 1310. Fluid trajectories 1310 may correspond at least one of hot or pressurized fluid generated by the operation of the depicted battery modules 104 separated by crossmember 106. Battery pack 1300 may further comprise at least one of mica barrier 1312 positioned above each of a plurality of enclosures formed at least partially by sidewall 102 and crossmember 106 between battery pack cover 1304 and battery pack base 1306. Battery pack cover 1304 and battery pack base 1306 may be fixedly attached to a base of sidewall 102 (e.g., a forward-facing sidewall and or a rear-facing sidewall). Battery modules 104 arranged on top of the other modules may be positioned such that pressurized or heated fluid vents upward towards battery pack cover 1304 while the lower layer of modules 104 may be positioned to vent downwardly toward battery pack base 1306.

FIG. 14 is a flowchart of method 1400 for at least one of manufacturing or venting a battery assembly (e.g., battery pack 100 of FIG. 1), in accordance with some embodiments of the disclosure. Method 1400 may comprise more or fewer than the steps depicted in FIG. 14. Method 1400 may be incorporated into the development, assembly, manufacturing, or venting of any or all of the components or features depicted in or described in reference to FIGS. 1A-13. Process blocks depicted with dashed borders comprise steps that are optional in developing, assembling, manufacturing, or venting battery pack 100 of FIG. 1.

At 1402, at least one sidewall comprising an inner wall, an outer wall, and at least one guiding rib is provided, wherein the at least one guiding rib comprises a first end that abuts the inner wall, a second end that abuts the outer wall, a profile structured to modify the trajectory of gas generated from inside the battery assembly. In some embodiments at 1402A, providing at least one sidewall comprises extruding a rigid material to form the at least one sidewall. In some embodiments, method 1400 further comprises machining, at 1402B, an inlet opening in the inner wall to expose a first side of the guiding rib. In some embodiments, at 1402C, an outlet opening is machined in the outer wall to expose a second side of the guiding rib, wherein machining the second opening comprises machining an accommodating recess for a vent structure. At 1404, the at least one sidewall is arranged to form an enclosure at least partially. At 1406, a battery module is arranged inside the enclosure, wherein the battery module comprises a plurality of battery cells. In some embodiments, at 1408, the vent structure is mounted to the outer wall such that the vent structure is aligned with the outlet opening.

In some embodiments, the battery assemblies described herein comprise sidewalls manufactured by a particular method. For example, a rigid material (e.g., aluminum), may be extruded into a shape that comprises at least one guiding rib. The guiding rib may comprises a profile corresponding to a target gas trajectory and wherein the at least one guiding rib interfaces with a first side of the extruded rigid material at a first location on the first side which is higher than where the guiding rib interfaces with a second side of the extruded rigid material. A first opening may be machined (e.g., milled or drilled) in the first side of the extruded rigid material to expose a first side of the guiding rib, wherein the first opening is positioned higher than a second opening in a second side. A second opening may also be machined (e.g., milled or drilled) in the second side of the extruded rigid material to expose a second side of the guiding rib, wherein machining the second opening comprises machining an accommodating recess for a vent structure. A vent structure may then be mounted to the second side of the sidewall. such that the vent structure is aligned with the second opening;

In some embodiments, the battery packs described herein may have venting structures or pressure release valves positioned in the sidewalls of the battery packs by a particular method of manufacture. A frame assembly may be provided for the battery pack. The frame assembly may comprise a plurality of sidewalls, wherein the plurality of sidewalls further comprises at least a forward-facing sidewall and a rear-facing sidewall. At least one of the battery pack or the frame assembly may comprise any number of additional components described herein or shown in FIGS. 1A-13. A first plurality of pressure release valves may be mounted on the forward-facing sidewall and a second plurality of pressure release valves may be mounted to the rear-facing sidewall. The pressure release valves may be two membrane pressure release valves, single membrane pressure release valves, and any combination thereof. The cumulative area of the pressure release valves may correspond with target gas egress rates and a target gas egress direction (e.g., towards the forward-facing sidewall or towards the rear-facing sidewall to avoid venting gas in the direction of critical vehicle components or occupant arears). Features of the various example battery packs herein may generally be combined without limitation, absent express statements herein to the contrary.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. A battery pack system, comprising:
   a first wall positioned in a first portion of a vehicle;
   a second wall positioned in a second portion of the vehicle;
   a first plurality of pressure release valves attached to the first wall to align with a first exit trajectory of a first portion of gas at least partially defined by a first guiding rib of the first wall, wherein the first plurality of pressure release valves releases gas through the first wall; and
   a second plurality of pressure release valves embedded in the second wall to align with a second exit trajectory of a second portion of gas at least partially defined by a second guiding rib of the second wall, wherein the second plurality of pressure release valves enables egress of gas through the second wall.

2. The battery pack system of claim 1, the first wall comprising a front wall and the first portion of the vehicle comprising a front portion of the vehicle, the second wall comprising a rear wall and the second portion of the vehicle comprising a rear portion of the vehicle, wherein:
   the first wall comprises a top lateral edge; and
   the first plurality of pressure release valves comprises at least a first pressure release valve and a second pressure release valve positioned at an angle from the top lateral edge such that gas exiting either or both of the first pressure release valve and the second pressure release valve is directed away from the front wall and the rear wall.

3. The battery pack system of claim 2, wherein:
   the first plurality of pressure release valves is embedded in the first wall at a height corresponding to a flow rate to enable egress of gas pressurized within an enclosure formed at least partially by at least one of the first wall or the second wall; and
   the second plurality of pressure release valves is embedded in the second wall such that the second plurality of pressure release valves are laterally aligned and at a height corresponding to a flow rate to enable egress of gas pressurized within an enclosure formed at least partially by at least one of the first wall or the second wall.

4. The battery pack system of claim 1, further comprising:
   a pair of walls arranged to create an obtuse angle between a top lateral edge of each of the pair of walls and a top lateral edge of at least one of the first wall and the second wall, wherein the pair of walls are attached to respective ends of at least one of the first wall and the second wall; and
   at least one single membrane pressure release valve embedded in each wall of the pair of walls.

5. The battery pack system of claim 1, wherein an area corresponding to a first collective venting area of the first plurality of pressure release valves and a plurality of single membrane pressure release valves corresponds to an area corresponding to a second collective venting area of the second plurality of pressure release valves.

6. The battery pack system of claim 1, wherein at least one of the first plurality of pressure release valves or the second plurality of pressure release valves prevents venting gas from making physical contact with a vehicle frame.

7. The battery pack system of claim 1, wherein:
   at least one of the first guiding rib or the second guiding rib is formed as part of an aluminum extrusion;
   at least one of the first guiding rib or the second guiding rib is configured to modify a trajectory of pressurized gas generated by a plurality of battery cells within at least one enclosure formed at least partially by at least one of the first wall or the second wall; and
   the trajectory of pressurized gas is modified to direct vented gas away from components surrounding the battery pack system and away from an occupant area of the vehicle.

8. The battery pack system of claim 1, wherein a plurality of mica barriers is positioned above each of a plurality of enclosures formed at least partially by the first wall and the second wall.

9. The battery pack system of claim 1, wherein each of the first plurality of pressure release valves and second plurality of pressure release valves comprises a venting area structured to enable a maximum flow rate for egress of gas while preventing a threshold level of liquid ingress.

10. The battery pack system of claim 1, wherein:
at least one of the first plurality of pressure release valves corresponds to a target stiffness value for the first wall; and
at least one of the second plurality of pressure release valves corresponds to a target stiffness value for the second wall.

11. The battery pack system of claim 1, wherein:
at least one pressure release valve of the first plurality of pressure release valves and the second plurality of pressure release valves comprises an umbrella seal arranged within an opening in an outer surface of the first wall and/or the second wall, wherein the opening is configured to receive a housing of the at least one pressure release valve;
the umbrella seal is configured to have a sealing preload that enables egress of a gas based on a gas pressure generated during operation of the battery pack system; and
the sealing preload prevents a threshold amount of water ingress by corresponding to a target sealing load.

12. The battery pack system of claim 11, wherein the housing of the at least one pressure release valve comprises extensions configured to interface with the opening in the outer surface of the first wall or the second wall.

13. The battery pack system of claim 1, wherein at least one pressure release valve of the first plurality of pressure release valves and the second plurality of pressure release valves comprises a sealing gasket, wherein the sealing gasket is secured in a groove of a housing of the at least one pressure release valve.

14. The battery pack system of claim 1, wherein:
at least one pressure release valve of the first plurality of pressure release valves and the second plurality of pressure release valves comprises at least one rigid mount; and
the at least one rigid mount comprises at least one reinforcement vane arranged radially around an opening for a fastener, wherein the at least one reinforcement vane is structured to prevent deflection of the at least one rigid mount.

15. A method of manufacturing a battery pack configured to vent gas, comprising:
providing a battery pack frame, wherein the battery pack frame comprises a first wall and a second wall, wherein:
the first wall comprises a first guiding rib, and
the second wall comprises a second guiding rib;
mounting a first plurality of pressure release valves on the first wall such that each pressure release valve of the first plurality of pressure release valves aligns with a first exit trajectory of gas at least partially defined by the first guiding rib; and
mounting a second plurality of pressure release valves on the second wall such that each pressure release valve of the second plurality of pressure release valves aligns with a second trajectory of gas at least partially defined by the second guiding rib.

16. The method of claim 15, wherein mounting the first plurality of pressure release valves on the first wall comprises mounting two pressure release valves on a forward-facing wall.

17. The method of claim 15, wherein mounting the second plurality of pressure release valves on the second wall comprises mounting three pressure release valves on a rear-facing wall.

18. A method of venting gas from a battery pack of a vehicle, comprising:
positioning a first wall of the battery pack in a front of the vehicle, wherein the first wall comprises at least one first guiding rib;
positioning a second wall of the battery pack in a rear of the vehicle, wherein the second wall comprises at least one second guiding rib;
embedding a first plurality of pressure release valves in the first wall such that each pressure release valve of the first plurality of pressure release valves aligns with a first exit trajectory of gas at least partially defined by the at least one first guiding rib, wherein the first plurality of pressure release valves enables transfer of gas through the first wall along the at least one first guiding rib; and
embedding a second plurality of pressure release valves in the second wall such that each pressure release valve of the second plurality of pressure release valves aligns with a second trajectory of gas at least partially defined by the at least one second guiding rib, wherein the second plurality of pressure release valves enables transfer of gas through the second wall along the at least one second guiding rib.

19. The method of claim 18, wherein at least one of embedding the first plurality of pressure release valves or embedding the second plurality of pressure release valves comprises:
arranging at least one mounting extension of at least one pressure release valve of the first and second plurality of pressure release valves to align with a corresponding feature of an opening in the first or second wall; and
pressing a housing, comprising the at least one mounting extension, of the at least one pressure release valve of the first and second plurality of pressure release valves with sufficient force to arrange the at least one mounting extension into a compression fit with the corresponding feature of the opening in the first or second wall.

20. The method of claim 18, further comprising:
forming the at least one first guiding rib in an extruded material comprising the first wall wherein the at least one first guiding rib connects an opening on an inner surface of the first wall to an opening on an outer surface of the first wall;
forming the at least one second guiding rib in an extruded material comprising the second wall wherein the at least one second guiding rib connects an opening on an inner surface of the second wall to an opening on an outer surface of the second wall; and
machining an opening in each of the outer surface of the first wall and the outer surface of the second wall, wherein each opening in the outer surfaces comprises a corresponding feature configured to receive at least one mounting extension of at least one pressure release valve of the first plurality of pressure release valves and the second plurality of pressure release valves.

\* \* \* \* \*